US011782212B1

(12) United States Patent
Wu et al.

(10) Patent No.: US 11,782,212 B1
(45) Date of Patent: Oct. 10, 2023

(54) GUIDED-WAVE-DRIVEN METASURFACE ANTENNAS

(71) Applicant: City University of Hong Kong, Kowloon (HK)

(72) Inventors: Gengbo Wu, Shek Kip Mei (HK); Shuyan Zhu, Zhuhai (CN); Stella W. Pang, Wan Chai (HK); Chi Hou Chan, Kowloon (HK)

(73) Assignee: City University of Hong Kong, Kowloon (HK)

( * ) Notice: Subject to any disclaimer, the term of this patent is extended or adjusted under 35 U.S.C. 154(b) by 0 days.

(21) Appl. No.: 17/743,520

(22) Filed: May 13, 2022

(51) Int. Cl.
| | |
|---|---|
| *G02B 6/14* | (2006.01) |
| *H04B 10/61* | (2013.01) |
| *G02B 6/122* | (2006.01) |
| *G02B 1/00* | (2006.01) |
| *G02B 6/13* | (2006.01) |
| *H04B 10/114* | (2013.01) |

(52) U.S. Cl.
CPC ............ *G02B 6/14* (2013.01); *G02B 1/005* (2013.01); *G02B 6/1225* (2013.01); *G02B 6/13* (2013.01); *H04B 10/1141* (2013.01); *H04B 10/615* (2013.01)

(58) Field of Classification Search
CPC ......... G02B 6/14; G02B 6/1225; G02B 6/13; G02B 1/005; H04B 10/1141; H04B 10/615
USPC ........................................................ 385/28
See application file for complete search history.

(56) References Cited

U.S. PATENT DOCUMENTS

| | | |
|---|---|---|
| 8,625,942 B2 | 1/2014 | Na et al. |
| 9,057,844 B2 | 6/2015 | Doany et al. |
| 9,176,291 B2 | 11/2015 | Li et al. |
| 9,685,709 B2 | 6/2017 | Sabbadini et al. |
| 10,418,721 B2 | 9/2019 | Chattopadhyay et al. |
| 2017/0373385 A1 | 12/2017 | Alu et al. |
| 2021/0382371 A1* | 12/2021 | Ni ......................... G02F 1/2955 |

OTHER PUBLICATIONS

Atabaki, A. H. et al. Integrating photonics with silicon nanoelectronics for the next generation of systems on a chip. Nature 556, 349-354 (2018).
Feldmann, J. et al. Parallel convolutional processing using an integrated photonic tensor core. Nature 589, 52-58 (2021).
Sun, C. et al. Single-chip microprocessor that communicates directly using light. Nature 528, 534-538 (2015).
Wan, N.H. et al. Large-scale integration of artificial atoms in hybrid photonic circuits. Nature 583, 226-231 (2020).
(Continued)

*Primary Examiner* — Jerry M Blevins
(74) *Attorney, Agent, or Firm* — RENNER KENNER GREIVE BOBAK TAYLOR & WEBER

(57) ABSTRACT

A guided-wave-driven metasurface antenna includes an input for receiving a guided wave; an output for outputting a free-space wave; and a spatial frequency mixer connected between the input and the output for converting the guided wave to the free-space wave. The spatial frequency mixer is implemented by a metasurface of the antenna. The superheterodyne metasurface can be fabricated with high accuracy using lithography step similar to conventional waveguides made by the well-established semiconductor processing technology, making their integration with PICs straightforward.

15 Claims, 15 Drawing Sheets

(56) References Cited

OTHER PUBLICATIONS

Papes, M. et al. Fiber-chip edge coupler with large mode size for silicon photonic wire waveguides. Opt. Express 24, 5026-5038 (2016).
Almeida, V.R., Panepucci, R.R. & Lipson, M. Nanotaper for compact mode conversion. Opt. Lett. 28, 1302-1304 (2003).
Fang, Q. et al. Suspended optical fiber-to-waveguide mode size converter for silicon photonics. Opt. Express 18, 7763-7769 (2010).
Galán, J.V., Sanchis, P., Sánchez, G. & Marti, J. Polarization insensitive low-loss coupling technique between SOI waveguides and high mode field diameter single-mode fibers. Opt. Express 15, 7058-7065 (2007).
Hatori, N. et al. A hybrid integrated light source on a silicon platform using a trident spot-size converter. J. Lightwave Technol. 32, 1329-1336 (2014).
Cheben, P. et al. Refractive index engineering with subwavelength gratings for efficient microphotonic couplers and planar waveguide multiplexers. Opt. Lett. 35, 2526-2528 (2010).
Cheben, P. et al. Broadband polarization independent nanophotonic coupler for silicon waveguides with ultra-high efficiency. Opt. Express 23, 22553-22563 (2015).
Ang, T.W. et al. Highly efficient unibond silicon-on-insulator blazed grating couplers. Appl. Phys. Lett. 77, 4214-4216 (2000).
Masturzo, S.A., Yarrison-Rice, J.M., Jackson, H.E. & Boyd, J.T. Grating couplers fabricated by electron-beam lithography for coupling free-space light into nanophotonic devices. IEEE Trans. Nanotechnol. 6, 622-626 (2007).
Orobtchouk, R. et al. High-efficiency light coupling in a submicrometric silicon-on-insulator waveguide. Appl. Opt. 39, 5773-5777 (2000).
Van Laere, F. et al. Compact and highly efficient grating couplers between optical fiber and nanophotonic waveguides. J. Lightwave Technol. 25, 151-156 (2007).
Roelkens, G., Van Thourhout, D. & Baets, R. High efficiency Silicon-on-Insulator grating coupler based on a poly-Silicon overlay. Opt. Express 14, 11622-11630 (2006).
Saha, T.K. & Zhou, W. High efficiency diffractive grating coupler based on transferred silicon nanomembrane overlay on photonic waveguide. J. Phys. D: Appl. Phys. 42, 085115 (2009).
Yang, S., Zhang, Y., Baehr-Jones, T. & Hochberg, M. High efficiency germanium-assisted grating coupler. Opt. Express 22, 30607-30612 (2014).
Yu, N. et al. Light propagation with phase discontinuities: generalized laws of reflection and refraction. Science 334, 333-337 (2011).
Ni, X., Emani, N.K., Kildishev, A.V., Boltasseva, A. & Shalaev, V.M. Broadband light bending with plasmonic nanoantennas. Science 335, 427-427 (2012).
Zheng, G. et al. Metasurface holograms reaching 80% efficiency. Nat. Nanotechnol. 10, 308-312 (2015).
Lin, D., Fan, P., Hasman, E. & Brongersma, M.L. Dielectric gradient metasurface optical elements. Science 345, 298-302 (2014).
Ni, X., Kildishev, A.V. & Shalaev, V.M. Metasurface holograms for visible light. Nat. Commun. 4, 1-6 (2013).
Li, L. et al. Electromagnetic reprogrammable coding-metasurface holograms. Nat. Commun. 8, 1-7 (2017).
High, A.A. et al. Visible-frequency hyperbolic metasurface. Nature 522, 192-196 (2015).
Gao, S., Park, C.S., Lee, S.S. & Choi, D.Y. A Highly Efficient Bifunctional Dielectric Metasurface Enabling Polarization-Tuned Focusing and Deflection for Visible Light. Adv. Opt. Mater. 7, 1801337 (2019).
Chen, Z., Deng, H., Xiong, Q. & Liu, C. Phase gradient metasurface with broadband anomalous reflection based on cross-shaped units. Appl. Phys. A 124, 1-8 (2018).
Liu, C. et al. All-dielectric three-element transmissive Huygens' metasurface performing anomalous refraction. Photonics Res. 7, 1501-1510 (2019).
Wang, S. et al. Broadband achromatic optical metasurface devices. Nat. Commun. 8, 1-9 (2017).
Khorasaninejad, M. et al. Achromatic metasurface lens at telecommunication wavelengths. Nano Lett. 15, 5358-5362 (2015).
Chen, W.T. et al. Broadband achromatic metasurface-refractive optics. Nano Lett. 18, 7801-7808 (2018).
Chen, P.-Y. & Alu, A. Mantle cloaking using thin patterned metasurfaces, physical review B84, 205110 (2011).
Yang, Y. et al. Full-polarization 3D metasurface cloak with preserved amplitude and phase. Adv. Mater. 28, 6866-6871 (2016).
Chen, P.-Y. et al. Nanostructured graphene metasurface for tunable terahertz cloaking. New J. Phys. 15, 123029 (2013).
Ye, W. et al. Spin and wavelength multiplexed nonlinear metasurface holography. Nat. Commun. 7, 1-7 (2016).
Huang, L., Zhang, S. & Zentgraf, T. Metasurface holography: from fundamentals to applications. Nanophotonics 7, 1169-1190 (2018).
Li, Z. et al. Achromatic Broadband super-resolution imaging by super-oscillatory metasurface. Laser Photonics Rev. 12, 1800064 (2018).
Wan, W., Gao, J. & Yang, X. Metasurface holograms for holographic imaging. Adv. Opt. Mater. 5, 1700541 (2017).
Gao, H. et al. Super-resolution imaging with a Bessel lens realized by a geometric metasurface. Opt. Express 25, 13933-13943 (2017).
Li, Z. et al. Controlling propagation and coupling of waveguide modes using phase-gradient metasurfaces. Nat. Nanotechnol. 12, 675-683 (2017).
Wang, C. et al. Metasurface-assisted phase-matching-free second harmonic generation in lithium niobate waveguides. Nat. Commun 8, 1-7 (2017).
Wang, R. et al. Broadband on-chip terahertz asymmetric waveguiding via phase-gradient metasurface. ACS Photonics 6, 1774-1779 (2019).
Smith, D.R., Yurduseven, O., Mancera, L.P., Bowen, P. & Kundlz, N.B. Analysis of a waveguide-fed metasurface antenna. Phys. Rev. Appl 8, 054048 (2017).
Guo, Y. et al. Chip-integrated geometric metasurface as a novel platform for directional coupling and polarization sorting by spin-orbit interaction. IEEE J. Sel. Top. Quantum Electron. 24, 1-7 (2018).
Guo, R. et al. High-bit rate ultra-compact light routing with mode-selective on-chip nanoantennas. Sci. Adv. 3, e1700007 (2017).
Meng, Y. et al. Ultracompact graphene-assisted tunable waveguide couplers with high directivity and mode selectivity. Sci. Rep. 8, 1-11 (2018).
Meng, Y. et al. Versatile on-chip light coupling and (de) multiplexing from arbitrary polarizations to controlled waveguide modes using an integrated dielectric metasurface. Photonics Res. 8, 564-576 (2020).
Guo, X., Ding, Y., Chen, X., Duan, Y. & Ni, X. Molding free-space light with guided wave-driven metasurfaces. Sci. Adv. 6, eabb4142 (2020).
Xie, C. et al. Bifocal focusing and polarization demultiplexing by a guided wave-driven metasurface. Opt. Express 29, 25709-25719 (2021).
Schwartz, M., Bennett, W.R. & Stein, S. Communication systems and techniques. (John Wiley & Sons, 1995).
Tse, D. & Viswanath, P. Fundamentals of wireless communication. (Cambridge university press, 2005).
Wang, C. et al. Integrated lithium niobate electro-optic modulators operating at CMOS-compatible voltages. Nature 562, 101-104 (2018).
Zhang, M. et al. Broadband electro-optic frequency comb generation in a lithium niobate microring resonator. Nature 568, 373-377 (2019).
Wang, C. et al. Monolithic lithium niobate photonic circuits for Kerr frequency comb generation and modulation. Nat. Commun. 10, 1-6 (2019).
Celler, G.K. & Cristoloveanu, S. Frontiers of silicon-on-insulator. J. Appl. Phys. 93, 4955-4978 (2003).
Colinge, J.P. Silicon-on-insulator technology: materials to VLSI: materials to VLSI. (Springer Science & Business Media, 2004).
Headland, D., Fujita, M. & Nagatsuma, T. Half-Maxwell fisheye lens with photonic crystal waveguide for the integration of terahertz optics. Opt Express 28, 2366-2380 (2020).

(56) References Cited

OTHER PUBLICATIONS

Headland, D., Klein, A.K., Fujita, M. & Nagatsuma, T. Dielectric slot-coupled half-Maxwell fisheye lens as octave-bandwidth beam expander for terahertz-range applications. arXiv preprint arXiv:2101.11210 (2021).

Monticone, F. & Alu, A. Leaky-wave theory, techniques, and applications: from microwaves to visible frequencies. Proc. IEEE 103, 793-821 (2015).

Harrington, R.F., Antennas, Propagation, S., Microwave, T. & Techniques, S. Time-harmonic electromagnetic fields, vol. 224. (McGraw-Hill New York, 1961).

Patrovsky, A. & Wu, K. Substrate integrated image guide (SIIG)—a planar dielectric waveguide technology for millimeter-wave applications. IEEE Trans. Microwave Theory Tech. 54, 2872-2879 (2006).

Fuchs, B. et al. Comparative design and analysis of Luneburg and half Maxwell fish-eye lens antennas. IEEE Trans. Antennas Propag. 56, 3058-3062 (2008).

\* cited by examiner

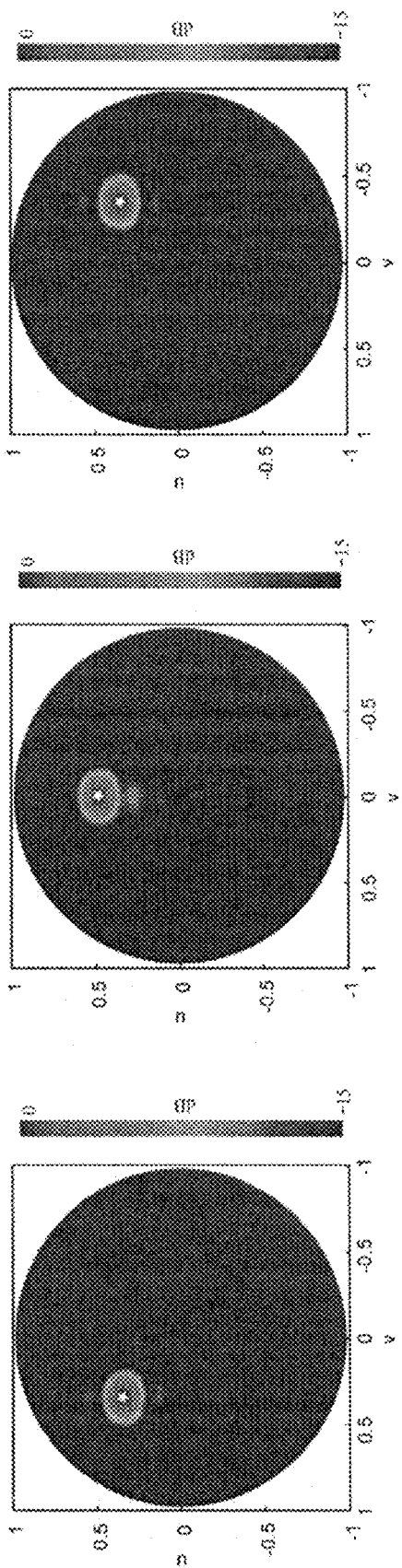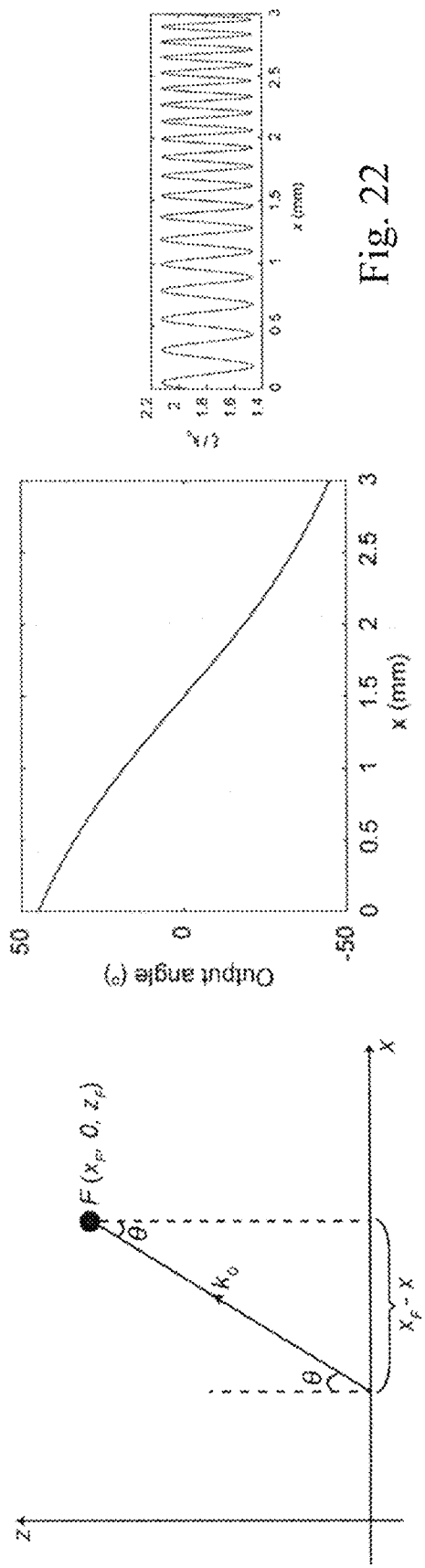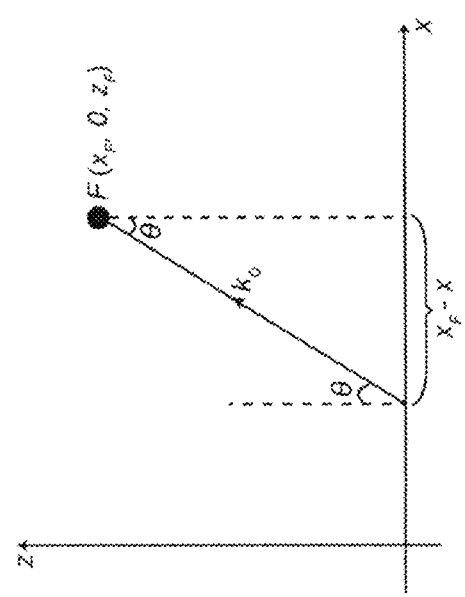
Fig. 19a  Fig. 19b  Fig. 19c
Fig. 20  Fig. 21  Fig. 22

GUIDED-WAVE-DRIVEN METASURFACE ANTENNAS

FIELD OF INVENTION

This invention relates to metasurfaces, and in particular to antennas utilizing metasurfaces.

BACKGROUND OF INVENTION

The exponential growth of data traffic due to emerging applications such as cloud services, augmented/virtual reality, and the Internet of Everything will exhaust available transmission and storage capacity of electronic chips, which have nearly reached their integration limit. As one solution to this challenge, photonic integrated circuits (PICs) like their electronic counterparts integrate multiple photonic components such as waveguides, lasers, polarizers, optical multiplexers/demultiplexers, and phase shifters into a single chip. Driven by photons rather than electrons, PICs feature distinct advantages such as higher speed, larger integration capacity, lower thermal effect, and lower power consumption, thus providing a viable solution to overcome electronic chips' integration and heat generation problems. Developing an interface that can bridge guided waves inside the integrated optical devices with free space is critically important in applying PICs to free space scenarios. The functionalities of conventional coupling technologies based on edge couplers and coupling gratings are however limited, and they suffer from high-order diffractions. Coupling light from free space to PICs has been a leading challenge at the device level, especially for the high refractive index contrast waveguides.

Metasurfaces with extraordinary light manipulation ability provide a promising solution to address the above challenge. A planar array of subwavelength structures with spatially varying geometric parameters such as shape, size, and orientation are used in metasurfaces to engineer light properties. These properties include phase front, amplitude, and polarization. However, the majority of studies so far have focused on free space-only or guided wave-only light control. The theory and methodologies of these metasurfaces are well-explored and mature after years of research and development. Specifically, using abrupt phase gradient, a plethora of free-space metasurfaces with extraordinary performance have been demonstrated, such as anomalous deflection, achromatic focusing, cloaking, holography, and high-resolution imaging. The free-space metasurfaces require external free-space light excitation in either reflection or transmission modes, prohibiting them from integrating with light sources on the same chip. On the other hand, by virtue of the strong optical scattering at the subwavelength intervals, guided wave-only metasurfaces have been demonstrated to realize different functionalities, such as waveguide mode conversion, second harmonic generation, and unidirectional transmission of guided waves. For these free space-only or guided wave-only metasurfaces, the input and output waves are both free-space waves or guided waves, and therefore they cannot realize the guided mode to free-space mode conversion that is highly sought-after for PICs. In contrast, there is limited progress in exploring guided wave-driven metasurfaces as a bridge linking guided mode and free-space mode. For conventional guided wave-driven metasurfaces, only a limited phase tuning range of x can be achieved due to the Lorentzian resonance of the meta-atoms in the waveguide. This limitation has recently been overcome by adopting metal-dielectric-metal meta-atoms to expand the phase range to $2\pi$. Different functionalities, including deflection, focusing, and orbit angular momentum generation, can be achieved. However, these guided wave-driven metasurfaces require additional meta-atoms to couple energy into free space, which inevitably increase the loss and fabrication complexity of the system. Moreover, the existence of the metallic materials will cause significant optical losses, limiting their application areas.

SUMMARY OF INVENTION

Accordingly, the present invention, in one aspect, is a guided-wave-driven metasurface antenna, which includes an input for receiving a guided wave; an output for outputting a free-space wave; and a spatial frequency mixer connected between the input and the output for converting the guided wave to the free-space wave. The spatial frequency mixer is implemented by a metasurface of the antenna.

In some embodiments, the metasurface includes a slab containing a plurality of holes, and a mirror underneath the slab.

In some embodiments, the plurality of holes are air holes.

In some embodiments, the plurality of holes is filled with a dielectric material that has a dielectric constant smaller than that of a material of the slab.

In some embodiments, the metasurface is adapted to generate a local spatial frequency of the spatial frequency mixer as a function of the radius of the plurality of holes.

In some embodiments, the metasurface is further adapted to remove spatial frequencies outside a passband of the antenna.

In some embodiments, the output of the antenna is implemented by the metasurface.

In some embodiments, the input contains a photonic waveguide.

In some embodiments, the input further contains a half-Maxwell fish eye lens connected between the photonic waveguide and the spatial frequency mixer.

In some embodiments, the photonic waveguide and metasurface are fabricated together on a silicon platform.

In another aspect of the invention, there is provided a free-wave-driven metasurface antenna, which includes an input for inputting a free-space wave; an output for outputting a guided wave; and a spatial frequency mixer connected between the input and the output for converting the free-space wave to the guided wave. The spatial frequency mixer is implemented by a metasurface of the antenna.

In a further aspect of the invention, there is provided a method of fabricating a guided-wave-driven metasurface antenna. The method contains the steps of providing a platform, and fabricating a metasurface on the platform. A spatial frequency mixer is implemented by the metasurface. The spatial frequency mixer is adapted to convert a guided wave to a free-space wave.

In some embodiments, the platform is a silicon wafer, and the step of fabricating a metasurface on the platform further includes forming a plurality of holes on the silicon wafer to fabricate the metasurface.

In some embodiments, the step of fabricating a metasurface on the platform further includes the step of etching the plurality of holes on the silicon wafer by lithography.

In some embodiments, the method further includes the step of attaching a mirror layer to a side of the platform opposite to another side of the platform on which the metasurface is fabricated.

Embodiments of the invention therefore provide novel waveguide-fed metasurface antennas which are designed using the superheterodyne principle. Traditional radio superheterodyne architecture is temporal. In contrast, the superheterodyne-inspired metasurface antennas according to embodiments of the invention are spatial. By simple modulation of the local spatial frequency of the guided wave in a transmission line for mimicking the frequency modulation (FM) radio in the spatial domain, in-plane guided waves can be transferred to and molded into any desired out-of-plane free-space waves. From reciprocity, the metasurface antenna can also couple free-space waves into the waveguide, working as a spatial superheterodyne receiver. In sharp contrast to other existing waveguide-driven metasurface antennas requiring adding additional meta-atoms above the waveguide to couple energy into free space, in some embodiments of the invention, 2D lattice of air holes are etched in the Si slab waveguide to engineer the local spatial frequency of the light wave. As a result, the superheterodyne metasurface antennas exhibit significant advantages of simpler structure, easier fabrication, and lower loss when compared with other metasurface antennas.

Metasurface antennas according to embodiments of the invention may find widespread applications for microwave, millimeter-wave, and terahertz high-gain far-field applications, such as 5G and B5G wireless communications and radar systems, as well as for near-field focusing applications in noncontact sensing, RFID system, millimeter-wave imaging, and wireless transmission energy systems. Metasurface antennas according to embodiments of the invention can also be used for integrated photonic platforms that should communicate with free space, such as LiFi and Lidar. The superheterodyne metasurface according to embodiments of the invention is like a marriage of radio communications and photonics. It provides a paradigm shift of metasurface designs and enables various applications, especially for the next generation of integrated photonic devices.

The foregoing summary is neither intended to define the invention of the application, which is measured by the claims, nor is it intended to be limiting as to the scope of the invention in any way.

BRIEF DESCRIPTION OF FIGURES

The foregoing and further features of the present invention will be apparent from the following description of embodiments which are provided by way of example only in connection with the accompanying figures, of which:

FIG. 1 is an illustration of the appearance of a guided-wave-driven metasurface antenna according to a first embodiment of the invention. The insert shows the schematic diagram of a superheterodyne transmitter that the antenna is equivalent to.

FIGS. 19a-19c illustrates corresponding full-wave simulated scattering patterns of the superheterodyne metasurface in the antenna of FIG. 1 in uv-space, respectively. The theoretic main beam directions in uv-space are marked as white stars in FIGS. 19a-19c.

FIG. 20 is a geometric representation of the light-focusing metasurface in the antenna of FIG. 1.

FIG. 21 shows calculated output angles of the free space light along the length of the metasurface aperture in the metasurface of the antenna of FIG. 1

FIG. 22 shows the local spatial frequency distribution of the focusing superheterodyne metasurface in the antenna of FIG. 1.

In the specification and drawings, like numerals indicate like parts throughout the several embodiments described herein.

DETAILED DESCRIPTION

Signal modulation has been the cornerstone of radio communications since the date of Marconi. The purpose of modulation in a communication link is to shift the baseband signal (such as audio, image, and video) frequency into other frequencies suitable for transmission. Superheterodyne architecture has been widely popular in modern radio communication systems to perform signal modulation and demodulation. Inspired by the superheterodyne principle in radio communications, embodiments of the invention enable the design of metasurfaces that could effectively convert in-plane guided mode within the waveguide into out-of-plane free-space mode, or vice versa. The superheterodyne-inspired metasurface is an excellent example showing how two seemingly unrelated fields of science can be combined, opening up new ways of metasurface design.

Figure 1:
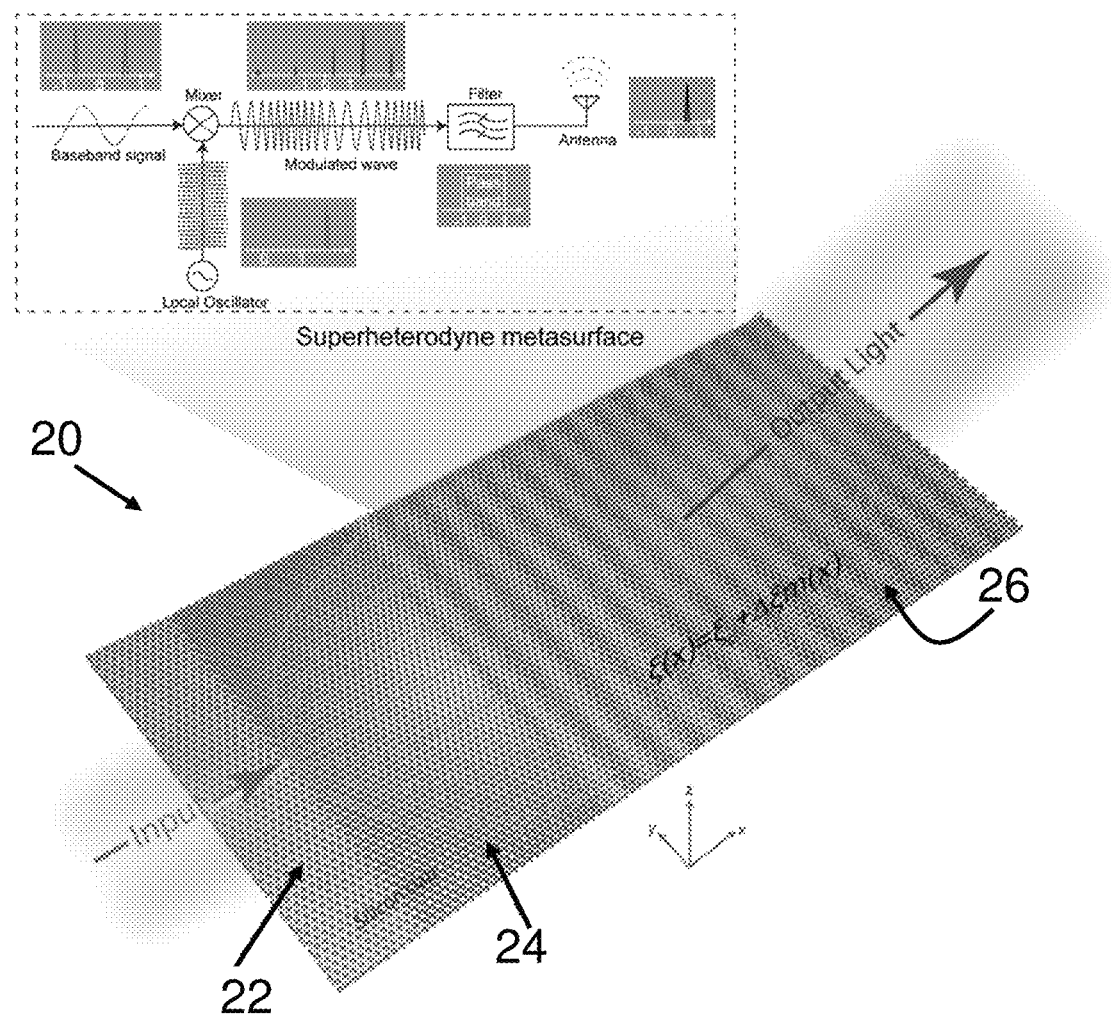
Figure 4:
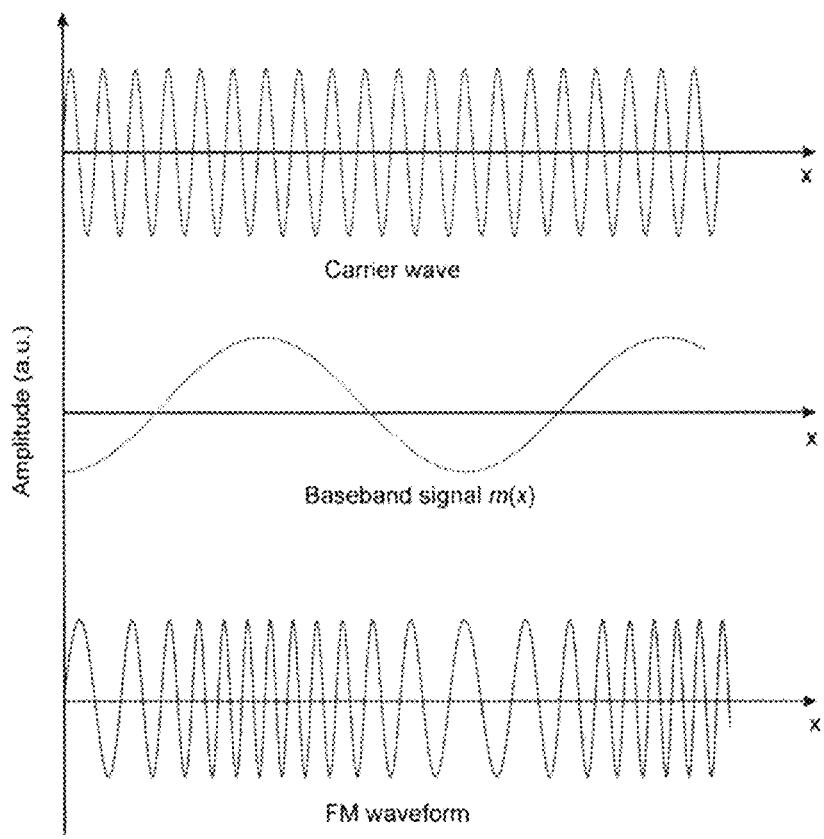
FIG. 4 shows waveforms of the carrier wave, the baseband signal, and the spatial FM of a guided wave traveling along a uniform waveguide according to an embodiment of the invention.

Borrowing the idea of superheterodyne architecture from radio communications, in one embodiment of the invention the superheterodyne metasurface performs the waveform modulation in spatial domain, as shown in the insert of FIG. 1. To clearly illustrate the concept, a guided wave traveling along a uniform waveguide (without spatial modulation) is firstly considered, whose waveform is illustrated as the carrier wave in FIG. 4. The electric field distribution of the unmodulated carrier wave is $E(r,t)=E_0 e^{1\zeta_c x} e^{-1\omega t}\delta(z)\hat{x}$. The parallel k vector of the guided wave $\zeta_c$ is larger than the free-space wavenumber $k_0=\omega/c$, where $\omega$ is the angular frequency, and c is the free-space light speed. The light is confined in the waveguide without spatial modulation and cannot be converted to free space waves due to the momentum mismatching. Then the frequency modulation (FM) is performed, which is described as varying the instantaneous frequency of the carrier wave in accordance with the message signal in FM radio communications. However, in contrast to FM radio performed in the time-domain, the superheterodyne metasurface conducts FM in the spatial domain. As shown in FIG. 4, the spatial FM is described as the local spatial frequency $\zeta$ of the carrier wave modulated by a judiciously designed baseband signal m(x)

$$\zeta(x) \triangleq \zeta_c + \Delta\zeta m(x) \quad (1)$$

In analogy to the instantaneous frequency in FM radio, the local spatial frequency is given as $$\xi = \frac{\partial \phi}{\partial x},$$

where $\phi$ is the phase of the wave at position x. In Eq. (1), $\zeta_c$ is the parallel k vector of the unmodulated carrier wave. $\Delta\zeta$ is the spatial frequency deviation, indicating the maximum shift of $\zeta(x)$ relative to the carrier spatial frequency c. The modulated spatial FM waveform can be written as $$E(r, t) = E_0 e^{i\int^x \xi(x')dx'} e^{-i\omega t}\delta(z)\hat{x} \quad (2)$$

For the simplest single-tone spatial FM scenario, i.e., the baseband signal is $m(x)=\cos(\zeta_m x)$, the spatial FM waveform is simplified as $$E(r,t)=E_0 e^{1\zeta_c x} e^{-1\omega t}\delta(z)\hat{x}\delta(z)\hat{x} \quad (3)$$

where $$M = \frac{\Delta\xi}{\xi_m}$$

is defined as modulation index. The waveform of the single-tone spatial FM is illustrated in FIG. 4. Based on the field distribution along the length of the guided wave in Eq. (3), the radiation field above the waveguide can be obtained by solving the Maxwell equations, and the exact solution is given as $$E(r, t) = E_0 \sum_{n=-\infty}^{\infty} \left(\hat{x} - \frac{\xi_c + n\xi_m}{k_{zn}}\hat{z}\right) J_n(M) e^{ik_{zn}z} e^{i(\xi_c+n\xi_m)x} e^{-i\omega t} \quad (4)$$

in the region z>0. In Eq. (4), $J_n(M)$ is the $n^{th}$ order Bessel function of the first kind with the argument M. From Eq. (4), an infinite number of space harmonics are generated for the spatial FM.

In the following section, the derivation of radiation field above the singe-tone FM superheterodyne metasurface is discussed. The principle of equivalence is adopted to calculate the radiation field above the single-tone FM superheterodyne metasurface. According to the principle of equivalence, the equivalent magnetic currents above the metasurface aperture are related to the tangential electric field $$M_s = -2\hat{n} \times E \quad (S1)$$

$$= -2E_0 e^{i[\xi_c x + M\sin(\xi_m x)]} e^{-i\omega t}\delta(z)\hat{y}$$

The bolded letters in Eq. (S) represent vectors in Eq. (S1). The magnetic current above will generate EM fields that can be calculated using the electric vector potential $F=\hat{y}F_y$. The electric vector potential $F_y$ satisfies the scalar Helmholtz equation.

$$\nabla^2 F_y + k_0^2 F_y = -M_s \quad (S2)$$

To obtain $F_y$, we substitute $M_s$ from Eq. (S1) into Eq. (S2) and expand the equivalent magnetic currents into Floquet series $$\nabla^2 F_y + k_0^2 F_y = 2E_0 e^{i[\xi_c x + M \sin(\xi_m x)]} e^{-i\omega t} \delta(z)$$

where $J_n(M)$ is the $n^{th}$ order Bessel function of the first kind with the argument M. Inspecting the right-hand side of Eq (S3), the solution of F can be expressed as $$F_y = \sum_{n=-\infty}^{\infty} A_n(z) e^{i(\xi_c + n\xi_m)x} e^{-i\omega t} \quad (S4)$$

Substituting Eq (S4) into Eq. (S3), and comparing term by term, we have $$\frac{\partial^2 A_n(z)}{\partial z^2} + k_{zn}^2 A_n(z) = 0 \quad (S5)$$

for the interested upper half-space $z>0$. In Eq. (S5), $k_{zn}$ satisfies the following relationship:

$$k_{zn}^2 = k_0^2 - k_m^2 \quad (S6)$$

The solution of Eq. (S5) is $$A_n(z) = C_n e^{ik_{zn}z} \quad (S7)$$

where $C_n$ is a constant. As a result, $F_y$ can be expressed as $$F_y = \sum_{n=-\infty}^{\infty} C_n e^{ik_{zn}z} e^{i(\xi_c + n\xi_m)x} e^{-i\omega t} \quad (S8)$$

Using the boundary conditions in $z=0$ plane, one can obtain the values of C and arrive at the final result of $F_y$.

$$F_y = E_0 \sum_{n=-\infty}^{\infty} \frac{J_n(M)}{ik_{zn}} e^{ik_{zn}z} e^{i(\xi_c + n\xi_m)x} e^{-i\omega t} \quad (S9)$$

The radiated electric and magnetic fields can be found based on the following relationship $$E = -\nabla \times F \quad (S10)$$

$$H = \frac{\nabla \times E}{i\omega\mu} \quad (S11)$$

The results of nonzero electric and magnetic fields produced by the singe-tone FM superheterodyne metasurface are $$E_x = E_0 \sum_{n=-\infty}^{\infty} J_n(M) e^{ik_{zn}z} e^{i(\xi_c + n\xi_m)x} e^{-i\omega t} \quad (S12)$$

Figure 5A:
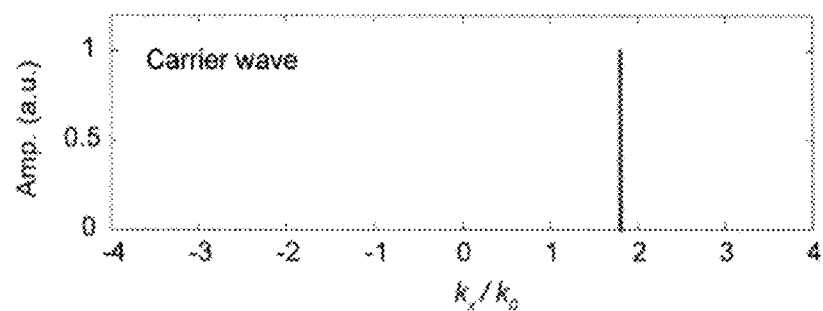
FIGS. 5a, 5b and 5c show respectively the corresponding normalized amplitude of the carrier wave, the baseband signal and the spatial M in the spatial frequency spectra of FIG. 4 respectively.
Figure 5B:
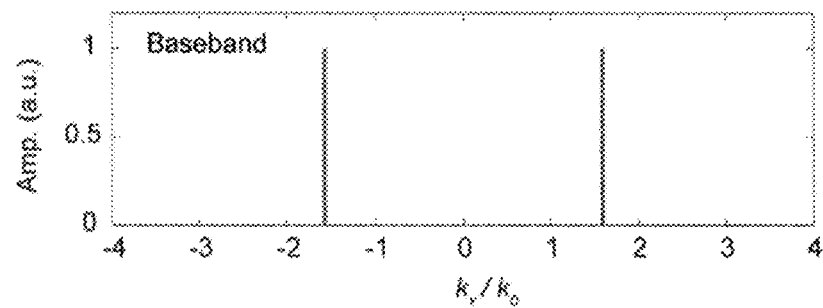
Figure 5C:
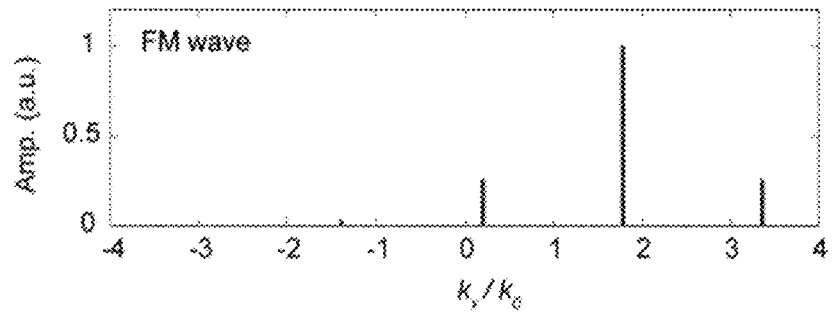

Harmonic analysis based on the Fourier transform has been proven powerful in describing and analyzing signals and systems in radio communications, which inspires inventors of this invention to analyze the spatial FM using space harmonic analysis. By conducting spatial Fourier transform of the carrier wave, baseband wave, and the FM waveform, the amplitude of their spatial spectrum distributions is illustrated in FIGS. 5a-5c. The specific mathematical expression is derived as follows.

$$\tilde{F}_{base}(k_x) = \frac{1}{2\pi} \int_{-\infty}^{\infty} \cos(\xi_m x) e^{-ik_x x} dx \quad (S15)$$
$$= \frac{1}{2} \delta(k_x - \xi_m) + \frac{1}{2} \delta(k_x + \xi_m)$$

The spatial frequency spectrum of the baseband signal is
The spatial frequency spectrum of the carrier wave is $$\tilde{F}_{carrier}(k_x) = \frac{1}{2\pi} \int_{-\infty}^{\infty} e^{i\xi_c x} e^{-ik_x x} dx = \delta(k_x - \xi_c) \quad (S16)$$

The spatial frequency spectrum of the single-tone FM waveform is $$\tilde{F}_{FM}(k_x) = \mathcal{F}\left(e^{i\xi_c x} e^{iM \sin(\xi_m x)}\right) \quad (S17)$$
$$= \mathcal{F}\left(e^{i\xi_c x}\right) \otimes \mathcal{F}\left[e^{iM \sin(\xi_m x)}\right]$$
$$= \mathcal{F}\left(e^{i\xi_c x}\right) \otimes \mathcal{F}\left[\sum_{n=-\infty}^{\infty} J_n(M) e^{in\xi_m x}\right]$$
$$= \delta(k_x - \xi_c) \otimes \sum_{n=-\infty}^{\infty} J_n(M) \delta(k_x - n\xi_m)$$
$$= \sum_{n=-\infty}^{\infty} J_n(M) \delta(k_x - \xi_c - n\xi_m)$$

In analogy with the FM radio, the spatial FM waveform contains a carrier component and an infinite set of side spatial frequencies located on the two sides of the carrier at a spatial frequency separation of m. It is well known that there is a one-to-one correspondence between the free-space wave and the spatial harmonics provided that $-1<k_x/k_0<1$. Compared with the spatial frequency spectrum of the unmodulated carrier wave, the spatial FM waveform has spatial frequency components that fall within the visible region $(-1<k_x/k_0<1)$, making the guided-wave mode to free-space mode conversion possible. Assuming that the $n=-1$ spatial harmonic is to be radiated, the output angle of the extracted beam is $$\theta = \sin^{-1} \frac{1}{k_0} (\xi_c - \xi_m) \quad (5)$$

Figure 2:
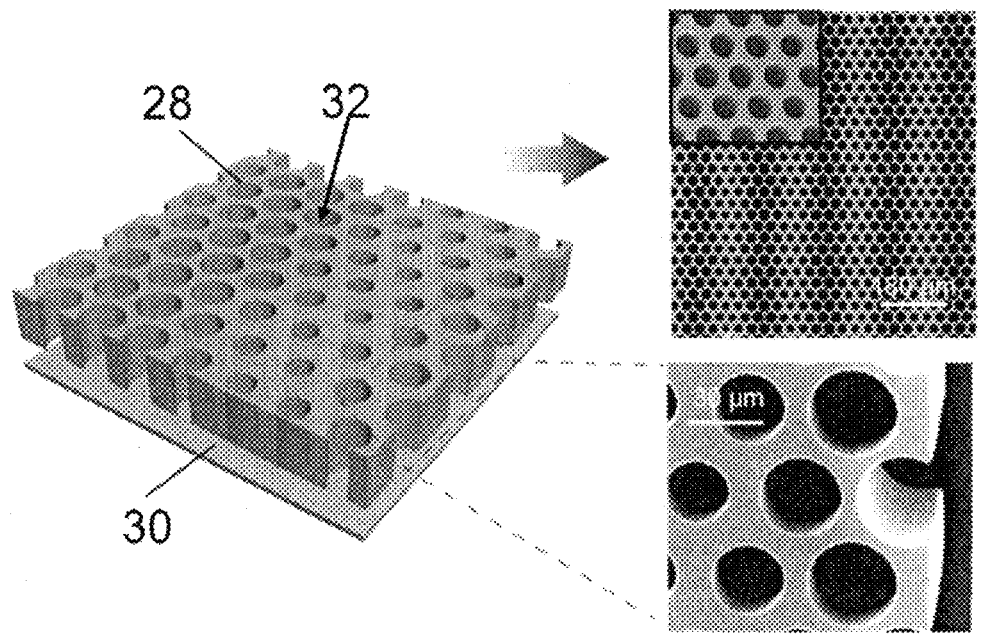
FIG. 2 shows the schematics micrograph of the superheterodyne metasurface in the antenna of FIG. 1. The inserts show respectively scanning electron micrographs of the metasurface.
Figure 3:
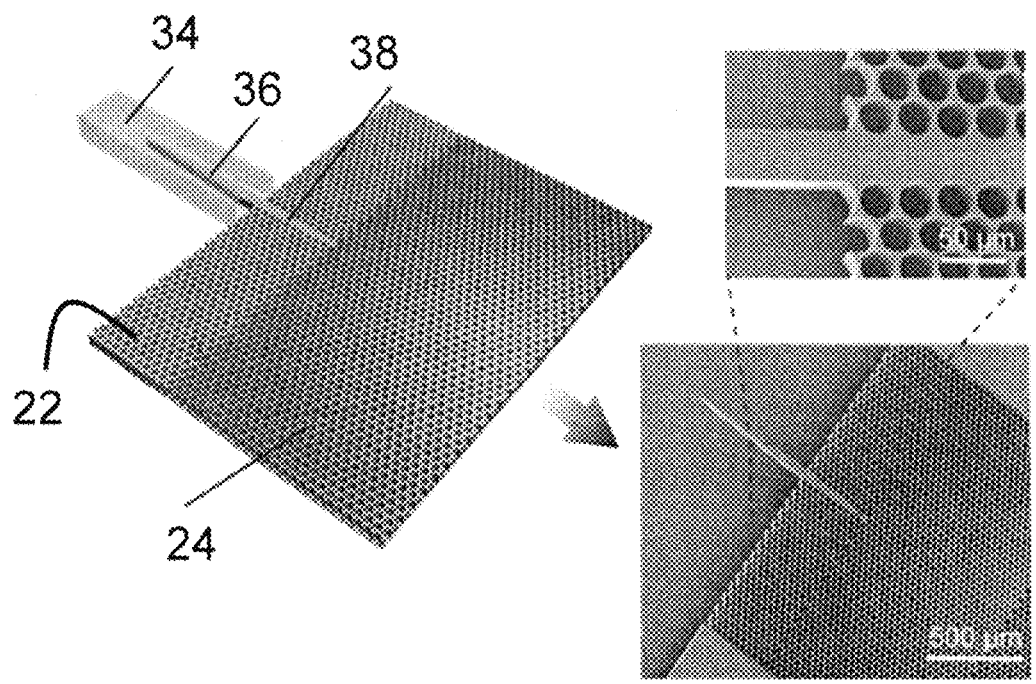
FIG. 3 shows the part of the metasurface in FIG. 1 when the antenna is connected to a Si taper tip and an external waveguide for an off-chip measurements. The inserts show respectively scanning electron micrographs of the portion of the metasurface near its joint to the Si taper tip.

The metasurface 26 in FIGS. 1-3 can be considered as a spatial superheterodyne transmitter for implementing the spatial FM, as shown in the insert of FIG. 1. The unmodulated carrier wave is treated as a local oscillator. The metasurface 26 firstly works as a spatial frequency mixer for combining the baseband and the carrier signals. New spatial frequencies are generated after the spatial frequency mixer. The spatial frequencies within the visible region correspond to out-of-plane propagating modes. The rest are evanescent modes. This behavior is equivalent to an ideal band-pass spatial filter invariably passing a finite block of spatial frequencies while completely removing spatial frequencies outside the passband. Due to the momentum matching, the spatial frequencies passing through the ideal spatial filter can be radiated into free space, equivalent to an antenna transmitting radio waves into space.

As a proof of concept, a guided-wave-driven metasurface antenna 20 as shown in FIGS. 1-3 is designed which contains the superheterodyne metasurface 26 implementing a spatial frequency mixer, a photonic waveguide 22 as an input of the antenna 20, and a half-Maxwell fisheye lens 24 connected between the photonic waveguide 22 and the superheterodyne metasurface 26. An end of the superheterodyne metasurface 26 furthest from the photonic waveguide 22 functions as an output of the antenna 20.

Figure 6A:
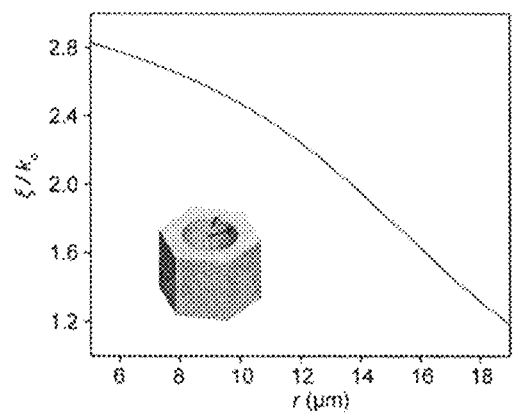
FIG. 6a is a graph showing simulated local spatial frequency as a function of the radius of the air hole at 1 THz in the antenna of FIG. 1.

The superheterodyne metasurface 26 is implemented in a Si platform comprising a Si slab 28 operating at f=1 THz. The single superheterodyne metasurface 26 can be implemented with all the functionalities of a spatial superheterodyne transmitter, including mixing, filtering, and radiating as in a conventional superheterodyne system. Although the metasurface 26 is operating at the terahertz spectrum, it should be noted that in other embodiments, the spatial superheterodyne metasurface 26 is also suitable to be realized in other frequency spectra. To engineer the local spatial frequency of light in the waveguide formed by the Si slab 28, a 2D lattice of densely packed, subwavelength air holes 32 in the Si slab 28 is developed, as shown in FIG. 2. The 180 μm and 30 μm as shown in FIG. 2 refer to the length of the reference white lines (scale bar) shown in the figure. As can be seen from FIG. 2, the multiple air holes 32 have different diameters in several directions along the area of the Si slab 28. Since the period of each air hole 32 is much smaller than the wavelength of the light, the diffraction effect can be suppressed, and the structure behaves as an effective bulk homogeneous material. A gold ground 30 acts as a mirror for the field in the superheterodyne metasurface 26, and it works as a one-sided shielding and provides mechanical support to the metasurface 26 at the THz spectrum. It should be noted that in other embodiments, the spatial superheterodyne metasurface 26 can also be implemented without any conductor for both TM and TE cases. The local spatial frequency of the Si slab 28 is determined by the volumetric fill factor of the air inclusions. For the fundamental $TM_{01}$ mode inside the Si-slab waveguide, the relationship between the local spatial frequency and the air-hole radius is given in FIG. 6a, obtained by a commercially available CST Studio Suite numerical simulator (the detailed simulation setup will be described later). As a result, one can perform spatial frequency modulation by locally tuning the radius of the air-hole cladding.

Figure 6B:
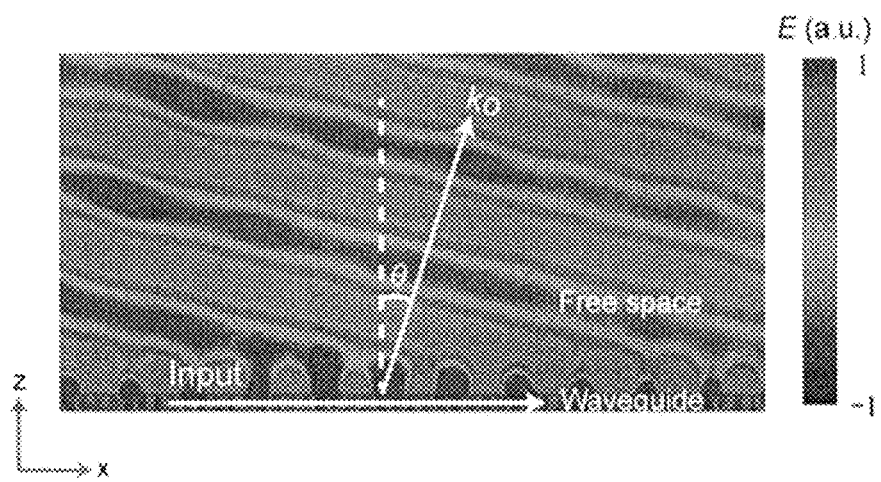
FIG. 6b is a full-wave simulated electric field distribution of the superheterodyne metasurface in the antenna of FIGS. 1-3, in the xz-plane at 1 THz.

Without loss of generality, consider a simplest single-tone spatial FM with a spatial frequency of the local oscillator $\zeta_c=1.8$ $k_0$, a spatial frequency of the sinusoidal baseband signal $\zeta_m=1.56$ $k_0$, and a modulation depth of M=0.25. The geometric parameters of the air-hole structure can be determined for realizing the required local spatial frequency based on the local spatial frequency-radius curve in FIG. 6a. FIG. 6b illustrates the simulated electric field distributions of the spatial superheterodyne metasurface in the xz-plane. The power in the Si waveguide is progressively leaked into free space towards the intended direction. For the convenience of off-chip measurement, a Si taper tip 36, a substrate integrated image guide (SIIG) 38, and a half-Maxwell fisheye lens 24 are also designed to feed the superheterodyne metasurface 26, as shown in FIG. 3. The 50 μm and 500 μm as shown in FIG. 3 refer to the length of the reference white lines (scale bar) shown in the figure. The Si taper tip 36 and the SIIG 38 are used to couple the energy from a standard WR-1.0 waveguide 34, while the functionality of the half-Maxwell fisheye lens 24 is to convert the point source field from the SIIG 38 into a collimated guided wave.

The design procedure to determine the geometric parameters and hole layout of the Si taper tip 36, SIIG 38, and half-Maxwell fisheye lens 24 are described in detail below. Note that these design procedures are by no means restrictive, as the above components may also be designed according to other procedures in order to achieve performances required for guided-wave-driven metasurface antennas according to embodiments of the invention.

Figure 7:
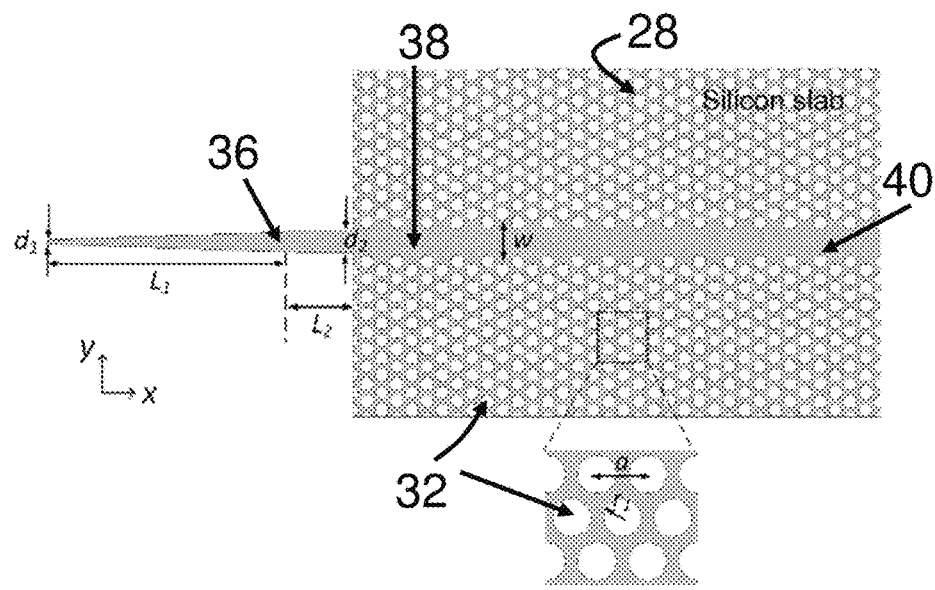
FIG. 7 illustrates a top view of the design of the Si taper tip and substrate integrated image guide (SIIG) in FIG. 3.
Figure 8:
FIG. 8 illustrates a front view of the design of the Si taper tip and SIIG in FIG. 3.
Figure 9:
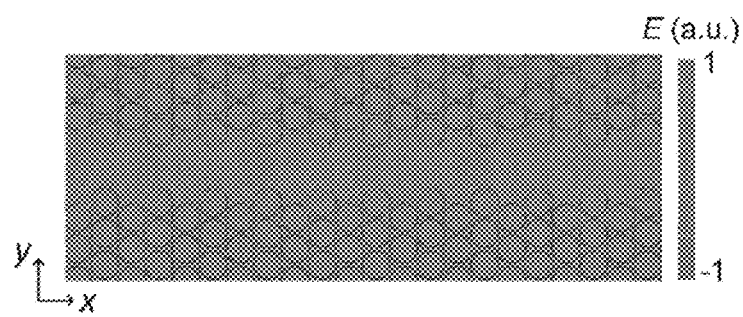
FIG. 9 shows numerical simulated electric field distribution of the SIIG in FIG. 3, in xy-plane at 1 THz.

The Si taper tip 36 is designed for broadband impedance matching and coupling energy from the standard WR-1.0 waveguide 34 during the off-chip measurement, as shown in FIGS. 7 and 8. A substrate integrated image guide (SIIG) is subsequently adopted for mechanical stability. The specific dimensions of the Si taper tip 36 and SIIG 38 are given in Table S1 below. The SIIG 38, a kind of substrate integrated circuits, mimics the wave-guiding property of a conventional image guide transmission line. The SIIG 38 consists of a lattice of air holes 32 etched into the Si slab 28 but leaves a core guiding channel (i.e., the guiding core 40) in the center. In this manner, the effective permittivity of the guiding core 40 is larger than that of the air-hole region to confine the light within the guiding core 40. The lattice periodic of the air holes 32 within the SIIG 38 is a=0.04 mm, which is much smaller than the wavelength (—~0.12 $\lambda_0$ at 1 THz) so that it can be equivalent to an effective bulk homogeneous material. The SIIG 38 operates at a much lower frequency of the photonic bandgap of the periodic hole lattice. The fundamental mode of the SIIG 38 is $TM_{11}$, and the electric field distribution at 1 THz along the SIIG 38 is shown in FIG. 9. It is observed that the majority of power is constrained within and propagates along the core Si guide. Note that the Si taper tip 36 and SIIG 38 are used here for THz off-chip measurement convenience, while the superheterodyne metasurface in practical PICs can be directly fed by the photonic circuits.

TABLE S1

Dimensions of the Si taper tip and the SIIG (Unit: μm)

| Para. | $L_1$ | $L_2$ | $d_1$ | $d_2$ | w | a | $r_1$ | h |
|---|---|---|---|---|---|---|---|---|
| Value | 600 | 100 | 10 | 50 | 80 | 40 | 34 | 40 |

Figure 10:
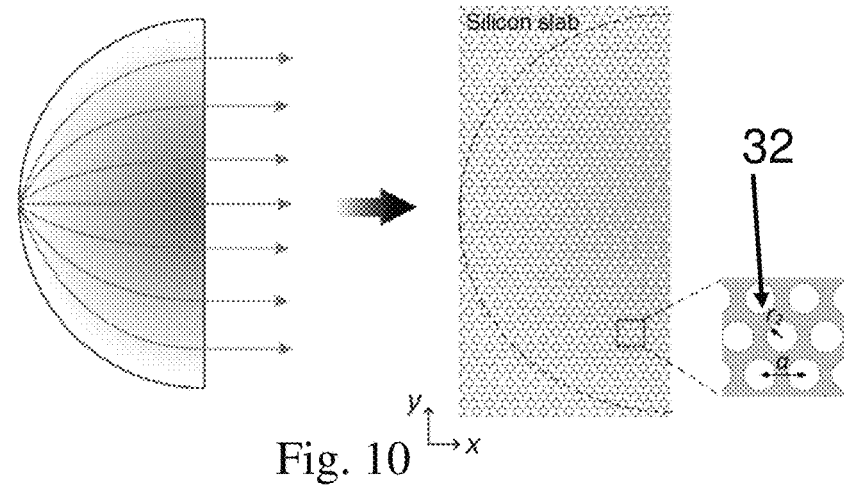
FIG. 10 illustrates the operating principle and configuration of the Si-based half-Maxwell fish eye lens in FIGS. 1-3 based on the Si slab.

Now turning to design process of the half-Maxwell fisheye lens 24. A half-Maxwell fisheye lens is a compact gradient index optic that generates a collimated beam fed by a point source at the apex of its circumferential arc, as shown in FIG. 10. The half-Maxwell fisheye lens 24 is used in the antenna 20 to generate a planar wavefront to feed the superheterodyne metasurface 26. The required refractive index distribution of the Maxwell fisheye lens is $$n(r) = \frac{n_{max}}{1+\left(\frac{r}{r_{max}}\right)^2} \quad (S23)$$

where r is the radial position of the Maxwell fisheye lens 24. $r_{max}=1$ mm and $n_{max}=2.7$ are the radius of the lens and the maximum refractive index located at the center of the lens, respectively.

Figure 11:
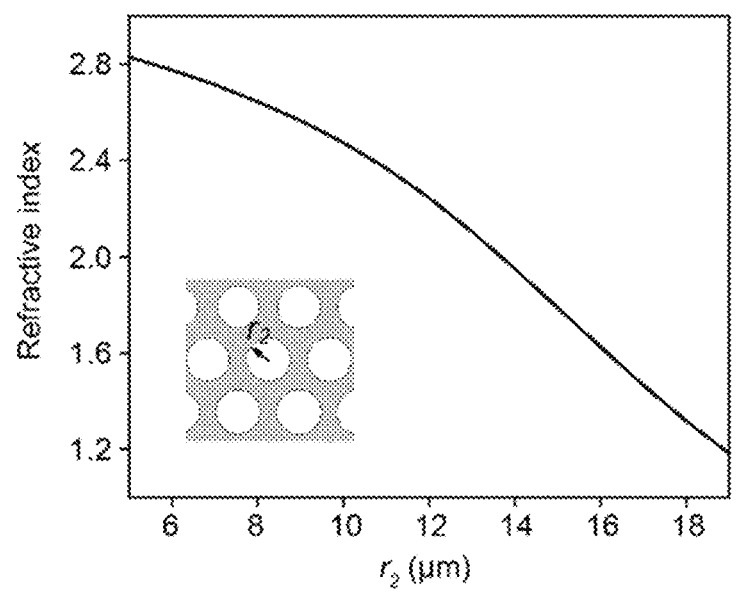
FIG. 11 illustrates numerical simulated equivalent refractive index of the air cladding structure as a function of the radius of the air holes at 1 THz, in the half-Maxwell fish eye lens in FIGS. 1-3.

The effective medium at the circumference of the half-Maxwell fisheye lens 24 is expanded to a rectangular region to increase the mechanical strength. Since the effective refractive index in the expanded region is low (n=1.2), it does not affect the functionality of the half-Maxwell fish-eye lens 24. The effective medium is also realized by the 2D lattice of the air holes 32. The equivalent refractive index of the air cladding structure as a function of the radius of the air hole is given in FIG. 11, which is obtained by the full-wave simulation using the CST Studio Suite simulator. Subsequently, the corresponding radii of the air cladding of the half-Maxwell fisheye lens 24 can be determined by matching the required refractive indices.

One can see from the above descriptions that in antenna 20, all of the three major components, i.e., the superheterodyne metasurface 26, the SIIG 38 and the half-Maxwell fisheye lens 24, are realized in the form of a 2D lattice of air holes 36. Although the same part number superheterodyne metasurface 36 is used to designate all air holes in the superheterodyne metasurface 26, the SIIG 38 and the half-Maxwell fisheye lens 24, it should be noted that the air holes 36 have different dimensions and have different functions in the three major components. The three major components can be fabricated conveniently together in a single lithography step, on a silicon platform. Note that the Si taper tip 36 and SIIG 38 are adopted here for latter off-chip measurement purpose, so they are not mandatory in the antenna 20. Rather, in applications of the antenna 20, the photonic circuits can directly feed the superheterodyne metasurface 26 in practical PICs.

Figure 12:
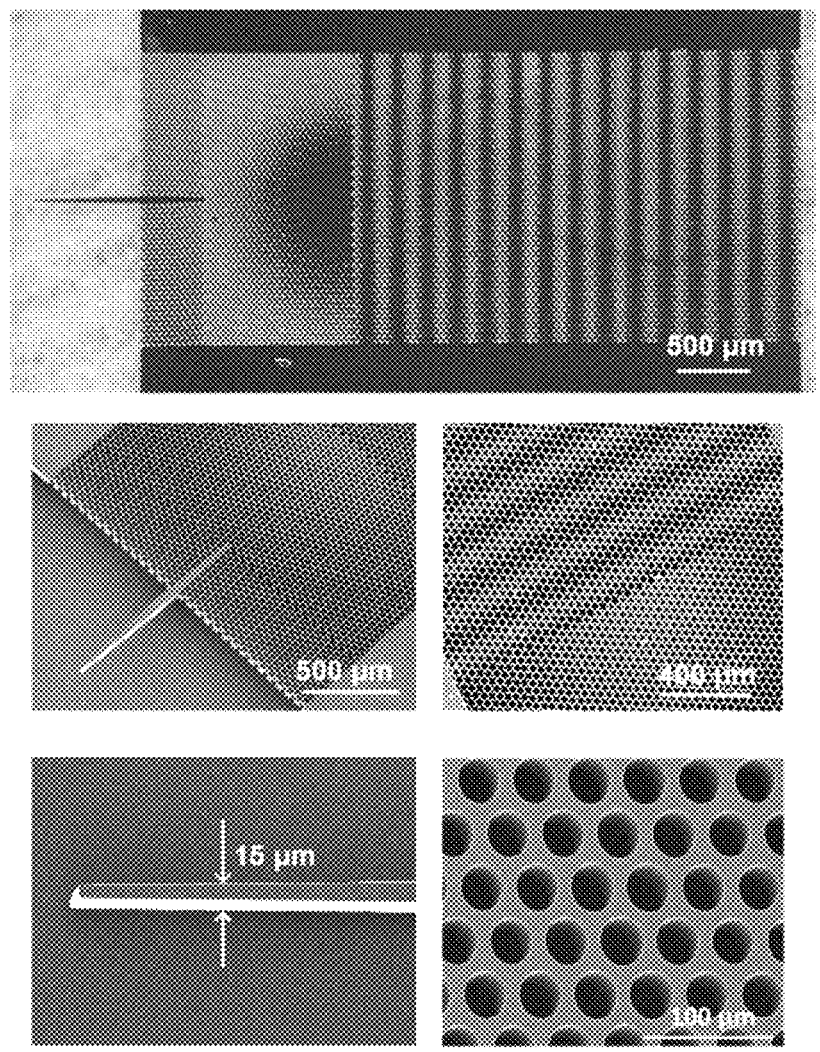
FIG. 12 shows various micrographs of a guided wave-driven metasurface prototype of the metasurface in the antenna of FIGS. 1-3.
Figure 13:
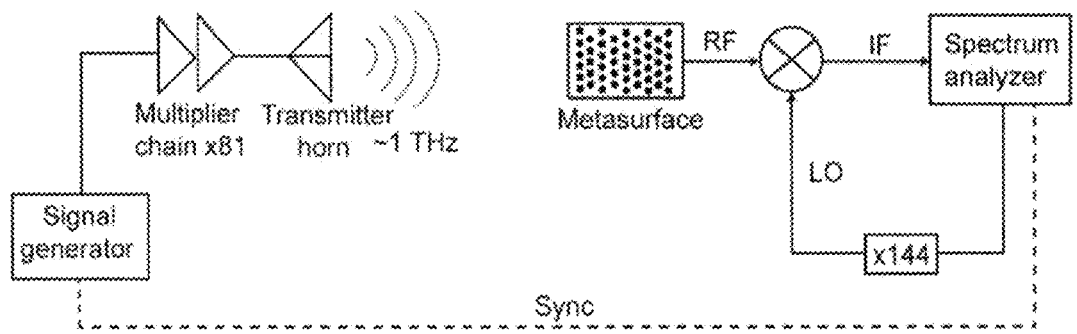
FIG. 13 shows a block diagram for a THz measurement setup of a prototype of the superheterodyne metasurface in the antenna of FIG. 1.
Figures 14, 15A:
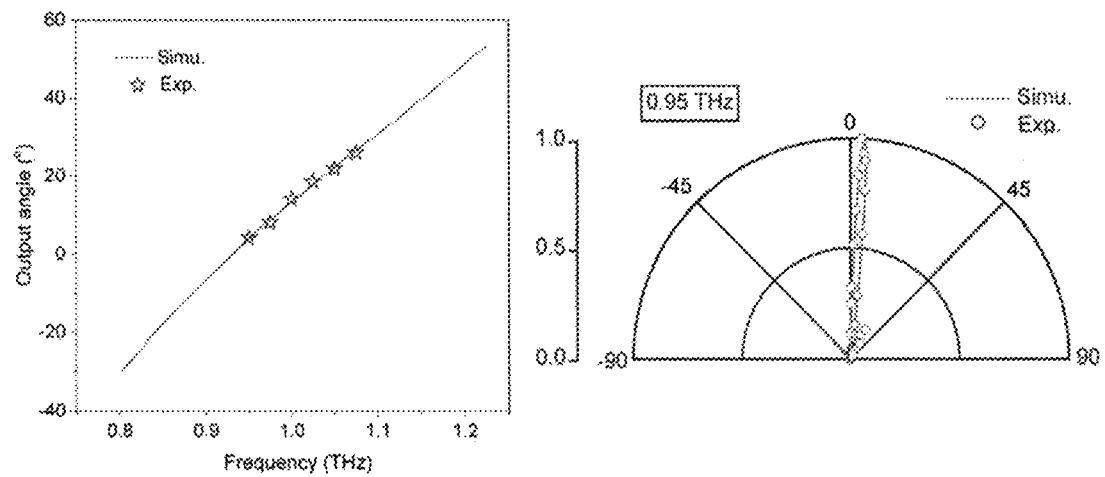
FIG. 14 shows measured (via the prototype) and simulated output angles of the superheterodyne metasurface in the antenna of FIG. 1 at different frequencies.
FIG. 15a shows measured (via the prototype) and simulated scattering radiation patterns of the superheterodyne metasurface in the antenna of FIG. 1 at 0.95 THz.
Figures 15B, 15C:
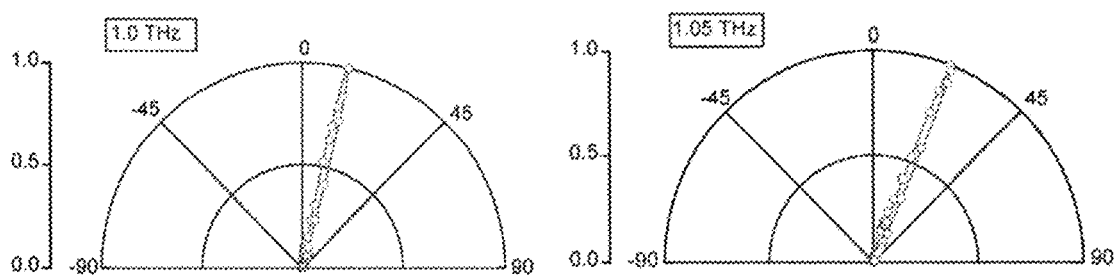
FIG. 15b shows measured (via the prototype) and simulated scattering radiation patterns of the superheterodyne metasurface in the antenna of FIG. 1 at 1.0 THz.
FIG. 15c shows measured (via the prototype) and simulated scattering radiation patterns of the superheterodyne metasurface in the antenna of FIG. 1 at 1.05 THz.
Figure 16:
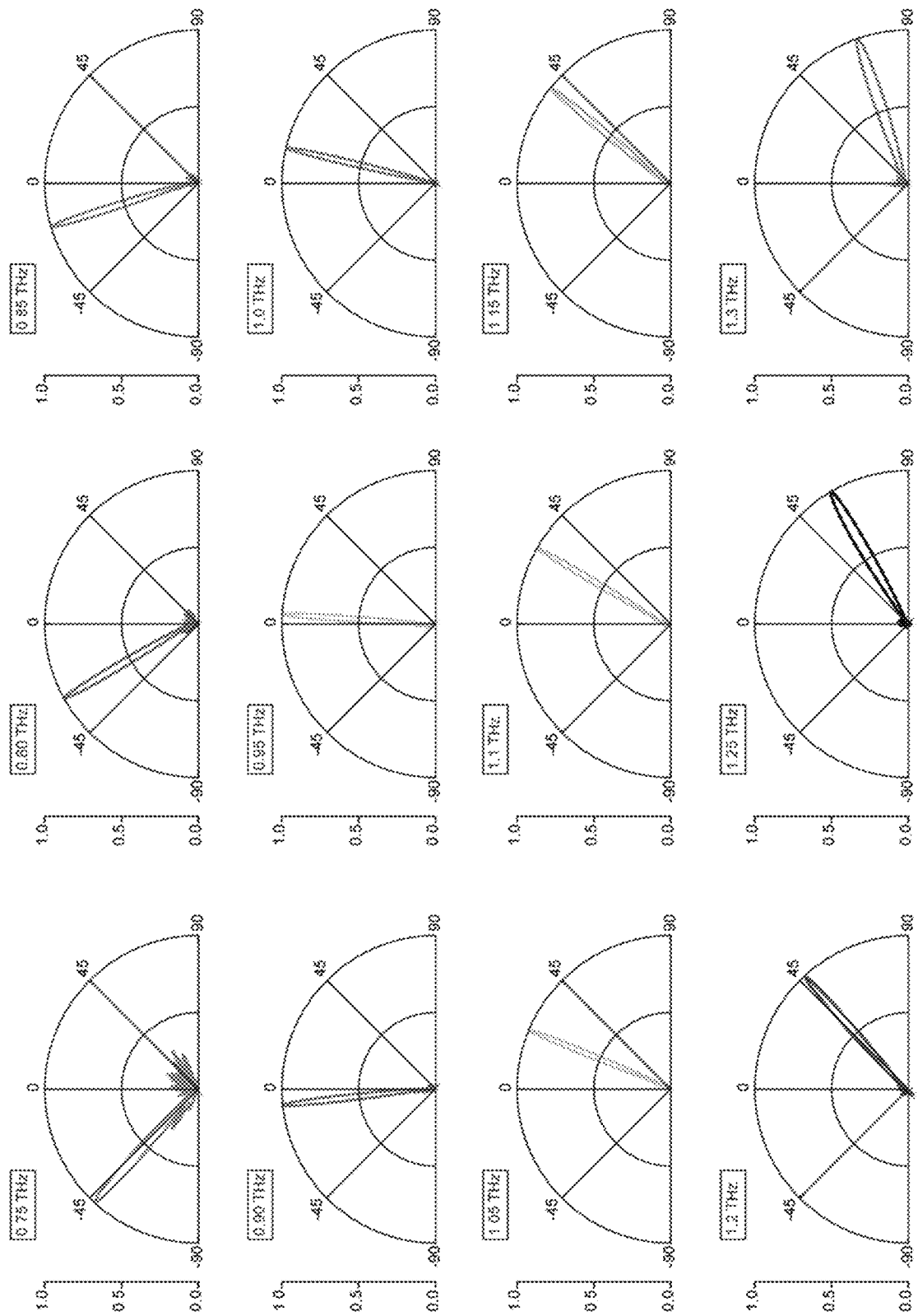
FIG. 16 shows full-wave simulated scattering patterns of the superheterodyne metasurface in the antenna of FIG. 1 from 0.75 to 1.3 THz.

Based on the above design, a sample of a Si slab 28 using deep reactive ion etching (DRIE) and lithography processes is then fabricated. The detailed fabrication process will be provided later. FIGS. 2-3 discussed above show the scanning electron microscope (SEM) images of the fabricated sample. More SEM images of the prototype are shown in FIG. 12. It is observed that the air-hole Si structure is well defined, showing the high accuracy of Si lithography and DRIE technologies. Due to the simple structure of our guided wave-driven metasurface, it possesses significant advantages of simple fabrication technologies and semiconductor foundry compatibility compared to other guided wave-driven metasurfaces with complex meta-atom structures. The far-field scattering patterns of the sample is experimentally measured, as shown in FIG. 13. The normalized scattering patterns along with the full-wave simulated results are illustrated in FIGS. 15a-15c. Limited by the currently available measurement setup, the scattering patterns of the metasurface are measured from 0.95 to 1.05 THz, and the simulated scattering patterns from 0.8 to 1.2 THz are shown in FIG. 16. The measured output angles of the free space wave at different frequencies are plotted in FIG. 14, and the results agree well with those of the full-wave numerical simulation using the CST Studio Suite. The slight discrepancy is caused by the tolerances in the fabrication and measurement processes. The full-wave simulated efficiency of the superheterodyne metasurface is 86%, which is much higher than 9% of the guided wave-driven metasurfaces due to the elimination of metallic loss.

y-Direction Beam Deflection

Figures 17A, 17B, 17C:
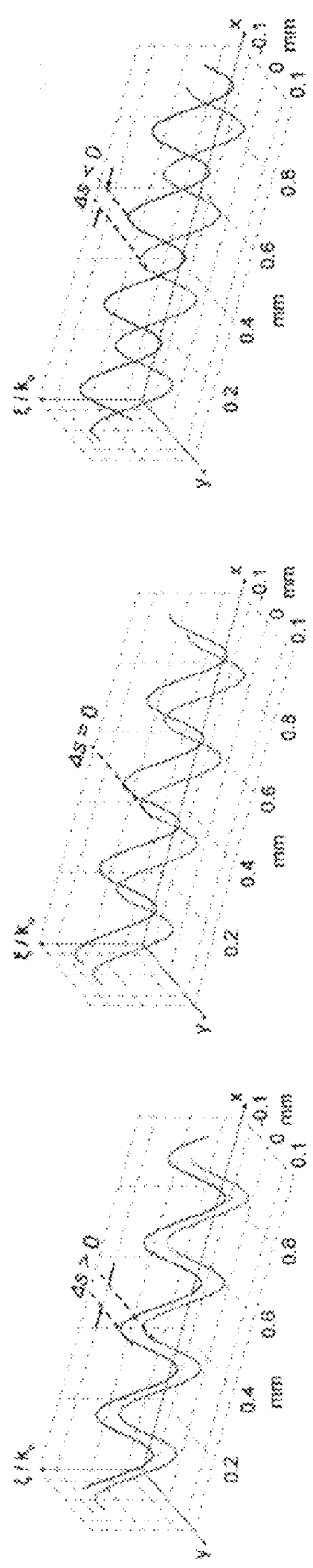
FIG. 17a illustrates the baseband signal distributions with space shifts by the superheterodyne metasurface in the antenna of FIG. 1, with space shift $\Delta s>0$.
FIG. 17b illustrates the baseband signal distributions with space shifts by the superheterodyne metasurface in the antenna of FIG. 1, with space shift $\Delta s=0$.
FIG. 17c illustrates the baseband signal distributions with space shifts by the superheterodyne metasurface in the antenna of FIG. 1, with space shift $\Delta s<0$.

The beam deflection in the above spatial superheterodyne metasurface 26 is realized only in the xz-plane because no modulation is conducted along the y-direction. This section shows that y-direction beam deflection can be realized by simply introducing a space translation for the baseband signal m(x). y-direction beam deflection is enabled by the shift theorem of spatial Fourier transform, which refers to translation in the space domain corresponding to a linear phase shift in the frequency domain. Consider two sinusoidal baseband signals with a space translation $\Delta s$ ($\Delta s > 0$), i.e., $m_2(x) = m_1(x - \Delta s)$, as shown in FIG. 17a. Suppose that $\tilde{F}_1$, $\tilde{F}_2$ are the spatial frequency spectra of the superheterodyne metasurface 26 modulated by the baseband signals $m_1(x)$ and $m_2(x)$, respectively, then one can get the following relationship $$\tilde{F}_2(k_x) = e^{-i(k_x - \zeta_c)\Delta s} \tilde{F}_1(k_x) \tag{6}$$

The detailed derivation of Eq. (6) is given below. For the baseband signal $m_1(x)$, the FM waveform $E_1(x)$, and its corresponding spatial frequency spectrum $\tilde{F}_1(k_x)$ are $$E_1(x) = E_0 e^{i\int^x \xi_c + \Delta\xi m_1(x')dx'} \tag{S18}$$

$$\tilde{F}_1(k_x) = E_0 \delta(k_x - \xi_c) \otimes G(k_x) \tag{S19}$$

$$= E_0 G(k_x - \xi_c)$$

where $\otimes$ is the convolution operation, and we define the spatial Fourier transform pair $$e^{i\int^x \Delta\xi m_1(x')dx'} \xleftrightarrow{FS} G(k_x).$$

For the baseband signal $m_2(x) = m_1(x - \Delta s)$, using the shift theorem of the Fourier transform, the FM waveform $E_2(x)$ and its corresponding spatial frequency spectrum $\tilde{F}_2(k_x)$ satisfy $$E_2(x) = E_0 e^{i\int^x \xi_c + \Delta\xi m_2(x')dx'} \tag{S20}$$

$$= E_0 e^{i\int^x \xi_c + \Delta\xi m_1(x' - Vs)dx'}$$

$$\tilde{F}_2(k_x) = E_0 \delta(k_x - \xi_c) \otimes [e^{ik_x Vs} G(k_x)] \tag{S21}$$

$$= E_0 e^{-i(k_x - \xi_c)Vs} G(k_x - \xi_c)$$

Compare Eq. (S19) and (S21), one obtains:

$$\tilde{F}_2 = e^{-i(k_x - \zeta_c)Vs} \tilde{F}_1(k_x) \tag{S22}$$

As a result, a space translation of the baseband signal $\Delta s$ brings an additional phase shift $-(k_x - \zeta_c)\Delta s$.

Figures 18A, 18B, 18C:
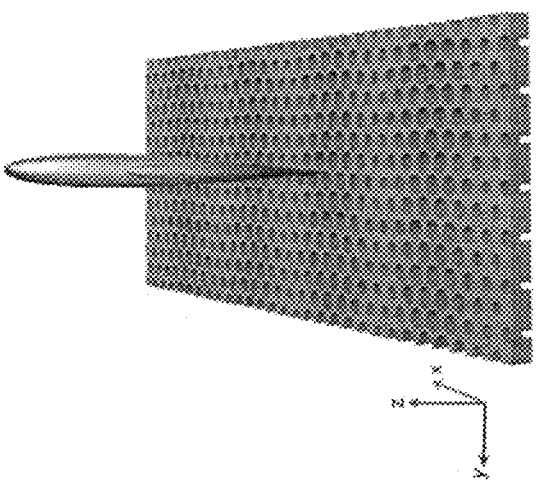
FIGS. 18a-18c illustrates the configurations of the synthesized Si superheterodyne metasurfaces in the antenna of FIG. 1, and corresponding simulated 3-D scattering patterns. Only a portion of the Si metasurface is shown in FIGS. 18a-18c for clear illustration purpose.

From Eq. (6), it can be observed that a space translation of the baseband signal brings an additional phase shift $-(k_x - \zeta_c)\Delta s$ with unchanged amplitude distribution. The resulting momentum along the y-direction is $k_y = -(k_x - \zeta_c)\Delta s/y$. As a result, one can conduct the same single-tone spatial FM along the x-direction to implement x-direction beam deflection while introducing space shifts of the baseband signals to realize y-direction beam deflection. In this manner, the output beam deflection angles along the x- and y-directions can be independently controlled. Without loss of generality, consider three superheterodyne metasurfaces whose intended free-space wave output angles are $(\theta, \varphi) = (30°, 45°)$, $(30°, 0°)$, and $(30°, -45°)$, respectively. FIGS. 17a-17c show the synthesized baseband signals with a space shift $\Delta s = 0.245$ y, 0, and $-0.245$ y based on Eq. (6), respectively. The corresponding generated momentums along the y-direction are $k_y = 0.354 k_0$, 0, and $-0.354 k_0$, respectively. The synthesized Si superheterodyne metasurfaces are illustrated in FIGS. 18a-18c, respectively. The full-wave simulated 2D scattering patterns in uv-space are illustrated in FIGS. 19a-19c, respectively. Apparent beam deflections in both x- and y-directions are observed, and the simulated main beam directions agree well with the theoretical ones. These results demonstrate the 2D free-space light manipulation capability of the superheterodyne metasurface 26.

Focusing Flexibility

In analogy with the radio communications where the transmitted information is coded in the baseband signal, one can judiciously design the baseband signal (not necessary to be sinusoidal waveform) of the superheterodyne metasurface 26 to perform light wave manipulation. Here it is demonstrated that the superheterodyne metasurface 26 can focus the light in free space with a designated focal point $F=(x_F, 0, z_F)$. Based on the geometric ray approach, the output angle of the free-space wave along the superheterodyne metasurface aperture should satisfy $$\tan\theta(x) = \frac{x_F - x}{z_F},$$

considering the geometrical relationship shown in FIG. 20. In FIG. 20 the superheterodyne metasurface is located at z=0, and the desired focal point is at $F(x_F, 0, z_F)$. As a proof of concept, assume that the focal point located at position F=(1.5 mm, 0, 1.5 mm) at 1 THz for a superheterodyne metasurface with an aperture length of 3 mm. The calculated output angles of light along the metasurface aperture are given in FIG. 21. Combining with Eq. (5), the baseband signal can be shown as below:

$$m(x) = \cos\left[\xi_c x - k_0 \int_0^x \sin\left(\tan^{-1}\frac{x_F - x'}{z_F}\right)dx'\right] \quad (7)$$

Figure 23A:
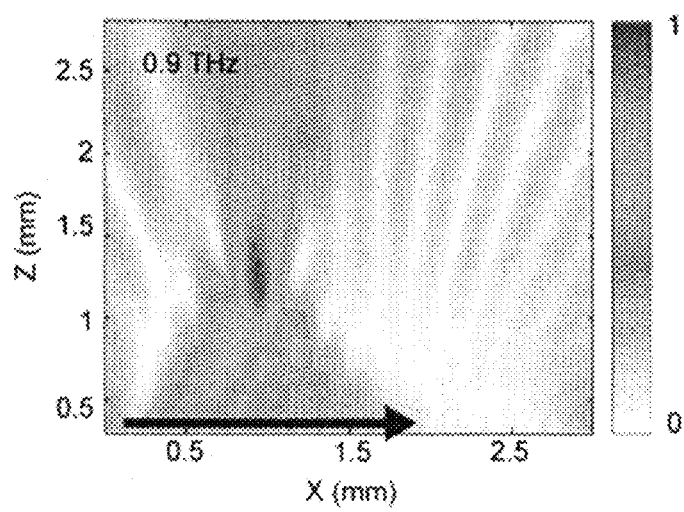
FIG. 23a shows a full-wave simulated electric field distributions of the superheterodyne metasurface for light focusing in the antenna of FIG. 1, in xz-plane at 0.9 THz.
Figure 23B:
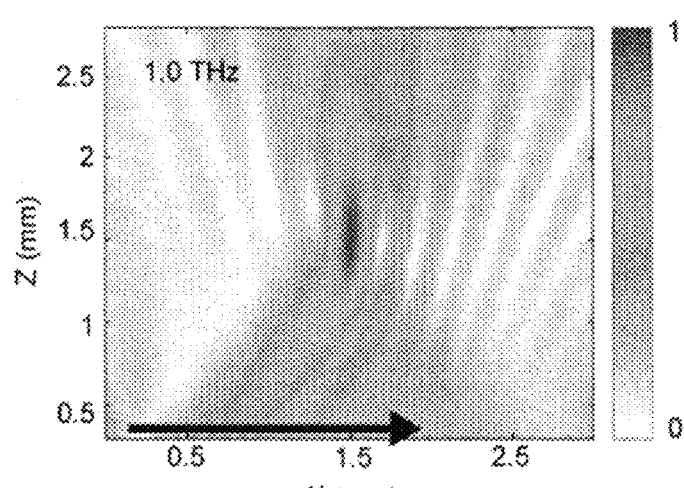
FIG. 23b shows a full-wave simulated electric field distributions of the superheterodyne metasurface for light focusing in the antenna of FIG. 1, in xz-plane at 1.0 THz.
Figure 23C:
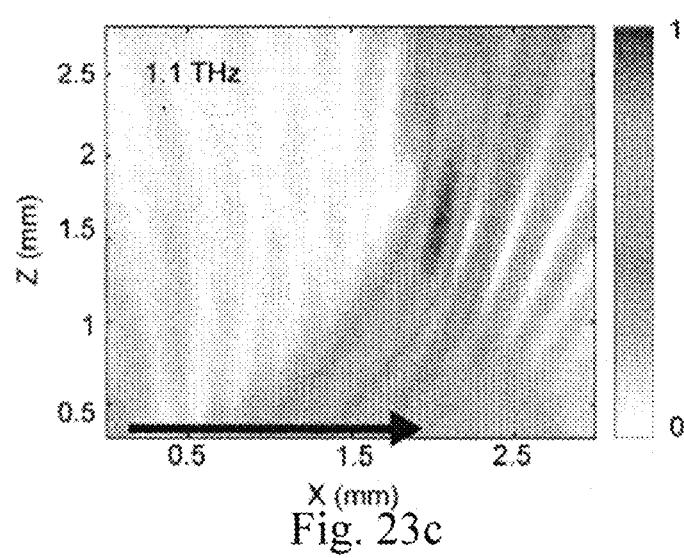
FIG. 23c shows a full-wave simulated electric field distributions of the superheterodyne metasurface for light focusing in the antenna of FIG. 1, in xz-plane at 1.1 THz.

FIG. 22 shows the calculated required local spatial frequency distribution for this focusing superheterodyne metasurface. The design curve in FIG. 22 is used to map a desired local spatial frequency to the corresponding radius of the air-hole cladding. The full-wave simulated electric field distributions at 0.9, 1, and 1.1 THz are illustrated in FIGS. 23a-23c, respectively. The results clearly demonstrate that the wave is leaked into free space and converged at the intended focal point, verifying the superheterodyne metasurface in the successful realization of light focusing.

In the above descriptions, uniform amplitude distribution of the waveform is assumed in the superheterodyne metasurface analysis process. However, since the power in the waveguide is progressively leaked into free space, the amplitude in downstream positions is smaller than that of the upstream ones. To investigate the amplitude attenuation effect, the spatial FM waveform in Eq. (3) is modified as $$E(r,t) = E_0 e^{j[\xi_c x + M \sin(\xi_m x)]} e^{-i\omega t} e^{-\alpha x} u(x) \delta(z) \hat{x} \quad (8)$$

where $\alpha$ is the attenuation constant related to the power leakage effect, and $u(x)$ is the Heaviside step function, considering that the waveguide is fed at x=0 and the power is delivered towards +x direction.

The spatial frequency spectrum of the FM waveform described by Eq. (8) is derive hereinafter. The spatial frequency spectrum of the modified spatial FM modulation in Eq. (8) can be calculated using the multiplication property of the Fourier transform $$F^\%(k_x) = F^\%\{E_0 e^{j[\xi_c x + M \sin(\xi_m x)]} e^{-\alpha x} u(x)\} \quad (S24)$$

-continued $$= F^\%\{E_0 e^{j[\xi_c x + M \sin(\xi_m x)]}\} \otimes F^\%\{e^{-\alpha x} u(x)\}$$

$$= E_0 \sum_{n=-\infty}^{\infty} J_n(M)\delta(k_x - \xi_c - n\xi_m) \otimes \frac{1}{2\pi(ik_x + \alpha)}$$

$$= E_0 \sum_{n=-\infty}^{\infty} \frac{J_n(M)}{2\pi[i(k_x - \xi_c - n\xi_m) + \alpha]}$$

Figure 24:
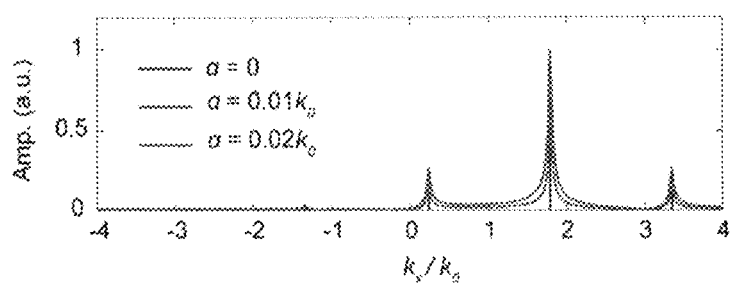
FIG. 24 illustrates spatial frequency distributions of the FM waveforms with different amplitude attenuation constants at 1 THz, according to embodiments of the invention.

The spatial frequency spectra with different attenuation constants are given in FIG. 24. The spatial spectrum expands for a larger attenuation constant, but the position of the amplitude peak is not affected by the attenuation constant. Therefore, the output angle of the free-space mode is not changed after considering the effects of waveguide amplitude attenuation. In other words, the space harmonic analysis shows that the attenuation effects do not affect the output angle of the free space wave. A larger attenuation constant results in a shorter effective waveguide length, thereby a larger beamwidth of the output beam.

Figure 25:
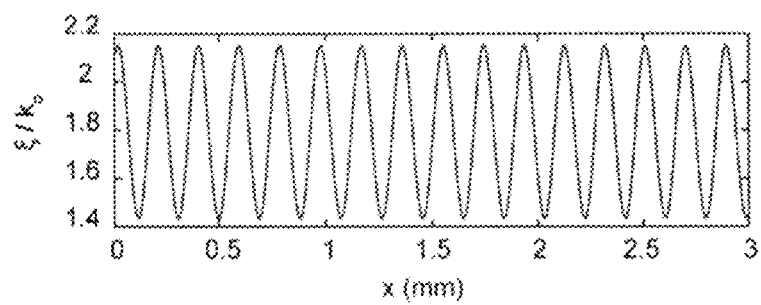
FIG. 25 shows the local spatial frequency of the superheterodyne metasurface in the antenna of FIG. 1, along the x-axis.

One may raise the question for superheterodyne metasurfaces according to embodiments of the invention; although the local spatial frequency is swinging over a range, the parallel k vector is always larger than the free-space wavenumber $k_0$ along the waveguide aperture, as shown in FIG. 25. Therefore, the guided wave cannot be converted into free-space mode. This argument is obviously inconsistent with our experimental and simulation results. The paradox is caused by mixing up the distinction between the local spatial frequency and spatial frequency. Although the local spatial frequency is always larger than $k_0$, the spatial frequency could be smaller than $k_0$, as shown in the spatial frequency distribution in FIGS. 5a-5c. Another clear difference between local spatial frequency and spatial frequency is that the local spatial frequency has a finite bandwidth from 1.4 $k_0$ to 2.2 $k_0$, while the spatial frequency spectrum occupies infinite bandwidth.

In summary, according to an embodiment of the invention it is proposed herein a superheterodyne-inspired metasurface that bridges the gap between the guided wave inside a waveguide and free-space mode. By simple modulation of the local spatial frequency of the wave in the waveguide for mimicking the FM radio in the spatial domain, in-plane guided waves can be transferred to out-of-plane free space waves. Based on the reciprocity principle, the metasurface can also couple free-space waves into the waveguide, working as a spatial superheterodyne receiver. The superheterodyne metasurface is implemented in a Si slab at the THz spectrum as a proof of principle. The local spatial frequency modulation is implemented by simply tuning the radius of the subwavelength air-hole cladding. More complex light wave manipulation, such as y-axis beam deflection and focusing, are also demonstrated. Compared to conventional guided wave-driven metasurfaces, the superheterodyne metasurfaces exhibit significant advantages of simpler structure, easier fabrication, and lower loss. The superheterodyne metasurface principle provides a new route to guided wave-driven metasurfaces design. It is foreseen that the superheterodyne metasurfaces can achieve more complex light wave manipulation via properly designed baseband signals. The superheterodyne metasurface is demonstrated at the THz spectrum in this embodiment, and it is easily transportable to near-infrared and visible spectra since they share the same semiconductor processing technology. The superheterodyne metasurface can enable various important applications, especially for the next generation of photonic integrated platforms.

Figure 26:
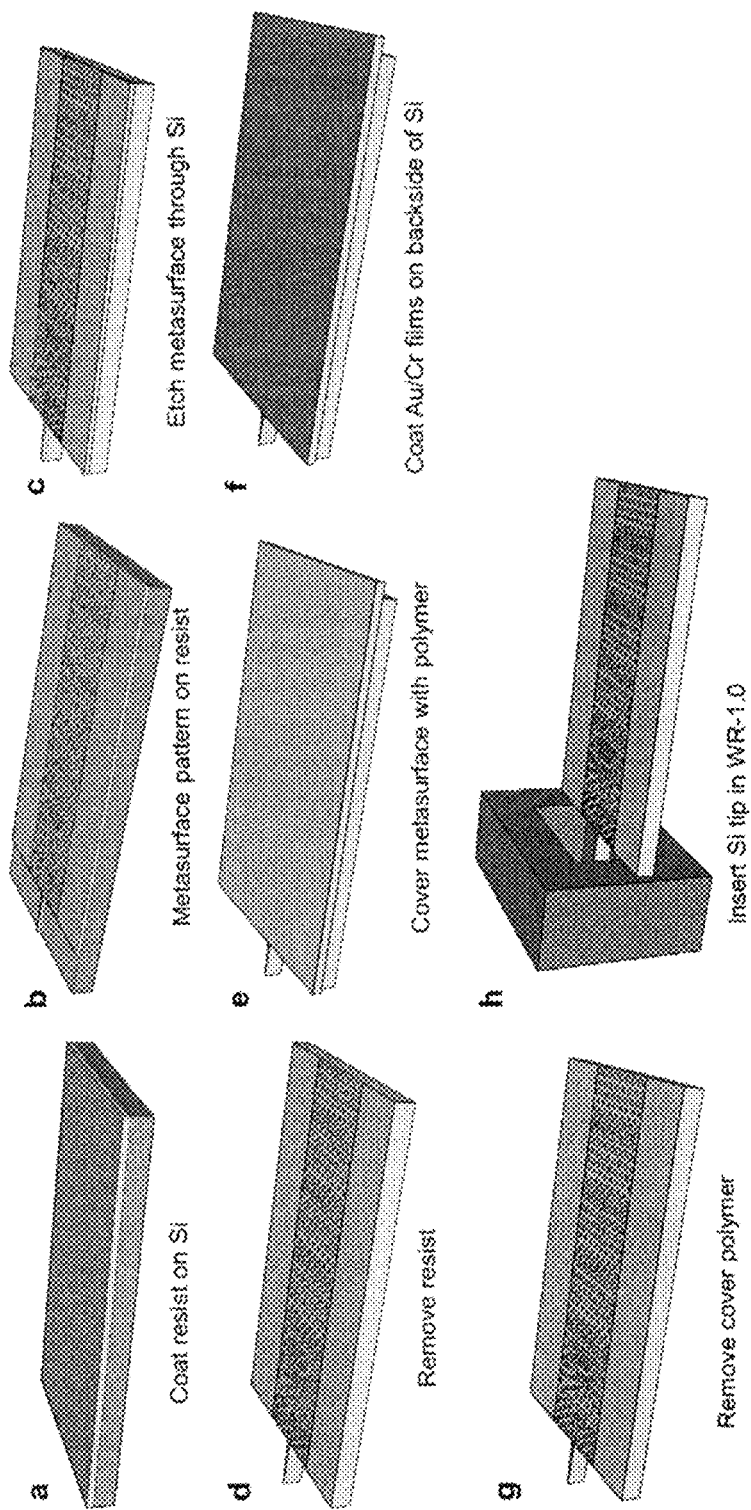
FIG. 26 illustrates a fabrication processes of the guided wave-driven metasurface according to an embodiment of the invention.

In the following section, a sample method according to another embodiment of the invention for producing the antenna in FIGS. 1-3 is briefly described. One should understand that the method is not restrictive—the antenna in FIGS. 1-3 may also be manufactured using other methods. Double side polished Si wafers with high resistivity ($\rho=1000$ $\Omega\cdot cm$), high dielectric constant ($\varepsilon_r=11.7$) and 100 μm thickness were first cleaned and thinned to 40 μm by Si drying etching technology using a deep reactive ion etching (DRIE) system. Then, the 40 μm thick Si wafer was rinsed with acetone, iso-propanol, and deionized water for 20 min, respectively, followed by $N_2$ drying and dehydrated at 120° C. for 10 min. The Si wafer was then treated with an $O_2$ plasma in a reactive ion etching (RIE) system with 20 sccm $O_2$, 20 mTorr, and 100 W rf power for 1 min to form a hydrophilic Si surface and coated 1.3 μm thick SPR 6112B resist at 3000 rpm for 1 min. After coating, the resist was prebaked at 95° C. for 5 min and then patterned by optical lithography with ultraviolet exposure for 6 s using SUSS MicroTech MJB4 mask aligner. The SPR6112B resist was then developed for 20 s and hard baked at 95° C. for 10 min. The metasurface pattern was generated on SPR6112B resist, and their residual layer was removed by plasma etching with 20/2 sccm $O_2/SF_6$, 20 mTorr, and 100 W rf power in a RIE system. The SPR6112B metasurface pattern was then used as a mask to etch through the 40 μm thick Si wafer using the DRIE system with the Bosch process for 80 cycles. The Si etching rate and selectivity in this DRIE Bosch process were 0.65 μm/cycle and 108, respectively, with an etch cycle of 120/13 sccm $SF_6/O_2$, 600 W coil power, 14 W platen power, and 30 mTorr for 8 s and a polymer passivation cycle of 85 sccm $C_4F_8$, 600 W coil power, and 16 mTorr for 5 s. The 40 μm thick Si metasurface was etched though with a high aspect ratio, anisotropic profile using the DRIE Bosch process. After Si drying etching, the SPR 6112B resist was removed by plasma etching with 1000 sccm $O_2$, 300 W rf power, and 100 mTorr for 20 min. The backside of the Si metasurface was then covered by a polymer sheet and 2/200 nm Cr/Au films were deposited on the tip of the Si metasurface. After Cr/Au deposition, the polymer sheet was removed and the Si metasurface was fixed on a 3D printed holder to help insert the Si tip into the central hole of the WR-1.0 waveguide. FIG. 26 summarizes the fabrication processes of the Si metasurface.

Numerical simulations of the antenna fabricated using the above process were carried out using a commercial software package, CST Microwave Studio 2021 (https://www.cst.com/products/cstmws). In the simulation of the local spatial frequency of the Si air-hole structure, eigenmode solver is adopted to find the eigenfrequency of the structure. Periodic boundaries are applied to the boundary of the unit cell. For a given air-hole radius, the phase delay across the unit cell was swept to find the phase delay corresponding to the operating frequency. Once this phase delay was found, the local spatial frequency can be obtained using $\zeta=\varphi/l$, where $\varphi$ is the phase delay cross the unit cell at the design frequency of 1 THz, and l represents the lattice size of the unit cell. The above simulation process is repeated for each air-hole radius to get the local spatial frequency versus radius design curve in FIG. 6a.

To simulate the beam deflection, a full Si slab model consisting of a Si taper tip, SIIG, half-Maxwell eye lens, and the superheterodyne metasurface was established. The geometric parameters and layout of the air-hole structure are determined based on the design process introduced previously. A standard WR-1.0 waveguide with wave port excitation is used to feed the whole Si slab model. Open boundaries are used for all boundaries.

Figure 27:
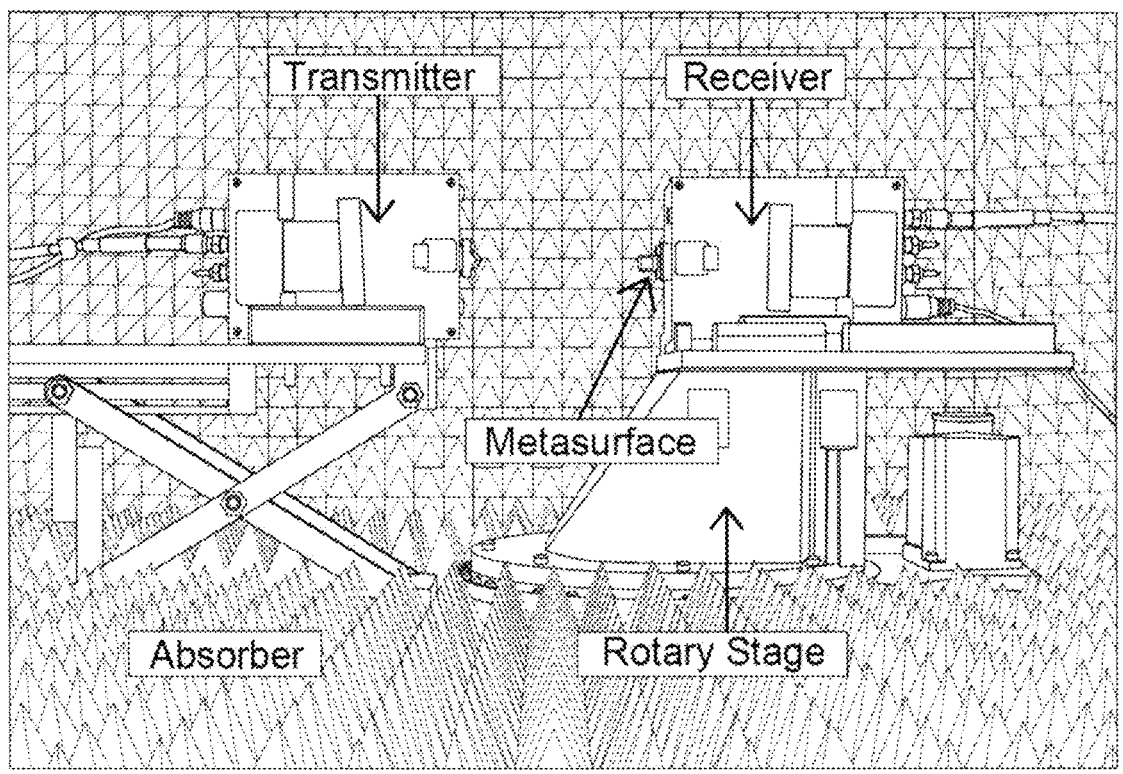
FIG. 27 is a photograph of the THz measurement setup for characterizing the scattering pattern of a guided wave-driven metasurface according to an embodiment of the invention.

The diagram and superheterodyne metasurface measurement setup photographs are shown in FIGS. 13 and 27, respectively. A signal generator (Agilent E8267D) launches a continuous microwave signal. The signal generator is connected to the extension module (VDI SGX 447), in which multiplier chains are deployed to up-convert the frequency to around 1 THz. A diagonal horn (VDI WM-250) is used at the transmitter side to radiate the THz wave into free space. The superheterodyne metasurface works as a receiving device, directly attached to a standard open-ended waveguide (W R-1.0) of the receiver. The mixer in the extension module (VDI SAX 482) and the spectrum analyzer (Agilent E8257D) down-converts the received THz signal to the microwave band. Absorbers are placed around the transmitter and receiver to eliminating possible reflections. Scattering pattern measurement of the superheterodyne metasurface is carried out by rotating the receiver, mounted on a rotary stage, with an angular step of 10. All the measurement equipment is placed on an optical table with vibration control.

As mentioned previously, from the measured and simulation results, it can be seen that the superheterodyne metasurface of FIGS. 1-3 exhibit distinct advantages compared to conventional guided wave-driven metasurfaces. First, the superheterodyne metasurface tailors the local spatial frequency of the guided wave to mimicking the frequency modulation (FM) in radio communications in the spatial domain. Such a scheme makes it operate totally differently from other metasurfaces. The superheterodyne metasurface in FIGS. 1-3 does not require a $2a$ phase-shift range that is difficult to realize for guided wave-driven metasurfaces. Second, the realization of superheterodyne metasurface does not require adding meta-atoms above the waveguide. Rather, the geometric structure of the waveguide itself is simply tailored by etching 2D lattice of subwavelength air holes in the silicon (Si) waveguide to engineer the local spatial frequency. The all-dielectric metasurface introduce negligible insertion losses to PICs and hence has a higher efficiency. Finally, the superheterodyne metasurface in FIGS. 1-3 can be fabricated with high accuracy using lithography step similar to conventional waveguides made by the well-established semiconductor processing technology, making their integration with PICs straightforward.

The exemplary embodiments are thus fully described. Although the description referred to particular embodiments, it will be clear to one skilled in the art that the invention may be practiced with variation of these specific details. Hence this invention should not be construed as limited to the embodiments set forth herein.

While the embodiments have been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

Exemplary embodiments described above implement and experimentally demonstrate guided wave-driven metasurface in a Si photonic platform at the terahertz (THz) spectrum as a conceptual illustration. However, those skilled in the art should understand that the metasurface is easily transposable to near-infrared or visible spectra. Si photonics is an attractive photonic integration platform due to its low power consumption, high-density integration capability, and complementary metal-oxide-semiconductor (CMOS) compatibility. The methodologies of the superheterodyne metasurfaces can also be equally applied to other integrated photonic material platforms, such as lithium niobate or Si on insulator.

In addition, in the exemplary embodiments described above, the local spatial frequency modulation is implemented by simply tuning the radius of the subwavelength air-hole cladding. Those skilled in the art should understand that more complex light wave manipulation, such as y-axis beam deflection and beam focusing, can also be achieved through changing the modulation signal.

In the preferred embodiments mentioned above, the metasurface contains air holes. However, one should understand that the air holes are just examples of possible implementations of the invention. Air is known to have a dielectric constant smaller than that of silicon material. From an electromagnetics point of view, the material inside the air holes is not limited to only air, as there are many other choices. More specifically, air in the air holes can be replaced with any material in other variations of the inventions, provided that the resultant metasurface can generate desired local spatial frequency. Therefore, all solid, gaseous and liquid materials can be used as long as the above-mentioned target can be achieved.

It should be noted that although in preferred embodiments mentioned above, air is used to fill into the air holes in the air holes, the invention is not limited to the use of air (e.g., that from atmosphere). Rather, a different gas including different gas mixtures can be used to fill the air holes, and air is only one example that is used to explain the invention. As skilled persons understand, when air is mentioned, it means a mixture of nitrogen, oxygen, and minute amounts of other gases that surrounds the earth and forms its atmosphere. When there is a need, the air holes can also be encapsulated to prevent the gap from leaking from the air holes.

What is claimed is:

1. A guided-wave-driven metasurface antenna, comprising:
   a) an input for receiving a guided wave;
   b) an output for outputting a free-space wave; and
   c) a spatial frequency mixer connected between the input and the output for converting the guided wave to the free-space wave;
   wherein the spatial frequency mixer is implemented by a metasurface of the antenna.

2. The antenna of claim 1, wherein the metasurface comprises a slab containing a plurality of holes, and a mirror underneath the slab.

3. The antenna of claim 2, wherein the plurality of holes are air holes.

4. The antenna of claim 2, wherein the plurality of holes is filled with a dielectric material that has a dielectric constant smaller than that of a material of the slab.

5. The antenna of claim 2, wherein the metasurface is adapted to generate a local spatial frequency of the spatial frequency mixer as a function of the radius of the plurality of holes.

6. The antenna of claim 2, wherein the metasurface is further adapted to remove spatial frequencies outside a passband of the antenna.

7. The antenna of claim 2, wherein the output of the antenna is implemented by the metasurface.

8. The antenna of claim 1, wherein the input comprises a photonic waveguide.

9. The antenna of claim 8, wherein the input further comprises a half-Maxwell fish eye lens connected between the photonic waveguide and the spatial frequency mixer.

10. The antenna of claim 8, wherein the photonic waveguide and the metasurface are fabricated together on a silicon platform.

11. A free-wave-driven metasurface antenna as a receiver, comprising:
    a) an input for inputting a free-space wave;
    b) an output for outputting a guided wave; and
    c) a spatial frequency mixer connected between the input and the output for converting the free-space wave to the guided wave;
    wherein the spatial frequency mixer is implemented by a metasurface of the antenna.

12. A method of fabricating a guided-wave-driven metasurface antenna, comprising the steps of:
    a) providing a platform; and
    b) fabricating a metasurface on the platform;
    wherein a spatial frequency mixer is implemented by the metasurface; the spatial frequency mixer adapted to convert a guided wave to a free-space wave.

13. The method of claim 12, wherein the platform is a silicon wafer, and step b) further comprises forming a plurality of holes on the silicon wafer to fabricate the metasurface.

14. The method of claim 13, wherein step b) further comprises the step of etching the plurality of holes on the silicon wafer by lithography.

15. The method of claim 12, further comprises the step of attaching a mirror layer to a side of the platform opposite to another side of the platform on which the metasurface is fabricated.

* * * * *